US011915615B2

(12) United States Patent
Biggin et al.

(10) Patent No.: US 11,915,615 B2
(45) Date of Patent: Feb. 27, 2024

(54) SYSTEMS AND METHODS FOR DETECTING COLLUSION IN STUDENT TESTING USING GRADED SCORES OR ANSWERS FOR INDIVIDUAL QUESTIONS

(71) Applicants: Mark Douglas Biggin, Eugene, OR (US); Jingyi Li, Los Angeles, CA (US); Guan'ao Yan, Los Angeles, CA (US)

(72) Inventors: Mark Douglas Biggin, Eugene, OR (US); Jingyi Li, Los Angeles, CA (US); Guan'ao Yan, Los Angeles, CA (US)

(*) Notice: Subject to any disclaimer, the term of this patent is extended or adjusted under 35 U.S.C. 154(b) by 0 days.

(21) Appl. No.: 17/450,984

(22) Filed: Oct. 14, 2021

(65) Prior Publication Data
US 2022/0114901 A1  Apr. 14, 2022

Related U.S. Application Data

(60) Provisional application No. 63/091,758, filed on Oct. 14, 2020.

(51) Int. Cl.
G09B 7/00 (2006.01)
G09B 7/06 (2006.01)
G09B 7/02 (2006.01)

(52) U.S. Cl.
CPC ............. G09B 7/00 (2013.01); G09B 7/02 (2013.01); G09B 7/06 (2013.01)

(58) Field of Classification Search
CPC ... G09B 7/00; G09B 7/02; G09B 7/06; G06Q 50/205
See application file for complete search history.

(56) References Cited

U.S. PATENT DOCUMENTS

2009/0291425 A1* 11/2009 Grove-Stephensen .. G09B 7/02
434/350
2015/0269857 A1* 9/2015 Feng ....................... G09B 7/00
434/353
(Continued)

FOREIGN PATENT DOCUMENTS

EP       4214694 A1    7/2023
WO    2022082219 A1    4/2022

OTHER PUBLICATIONS

International Search Report and Written Opinion for International Application No. PCT/US2021/071895, Search completed Dec. 7, 2021, dated Jan. 11, 2022, 16 Pgs.
(Continued)

Primary Examiner — Robert J Utama
(74) Attorney, Agent, or Firm — KPPB LLP

(57) ABSTRACT

Systems and methods for determining collusion in student academic exams are described. One embodiment includes receiving an input electronic file with academic test data that includes student identifiers, question scores associated with each student identifier, and the total score for each student, calculating an identity score for each pair of students, determining a maximum identity score for each student, generating a normalized collusion score for each student by subtracting from the maximum identity score an average identity score to generate an identity metric, and dividing the identity metric by a local average identity metric to generate a normalized collusion score, where the local average identity metric is an estimated average of a set of identity metrics for a subset of students adjacent to one another on the total test score ranked list, writing student identifiers and normalized collusion scores associated with student identifiers to an output electronic file.

43 Claims, 14 Drawing Sheets
(10 of 14 Drawing Sheet(s) Filed in Color)

(56) References Cited

U.S. PATENT DOCUMENTS

| | | |
|---|---|---|
| 2018/0061254 A1 | 3/2018 | Amigud |
| 2018/0232829 A1 | 8/2018 | Dorenkamp et al. |
| 2019/0068359 A1 | 2/2019 | Bhattacharya et al. |
| 2019/0095863 A1* | 3/2019 | Spaulding ............ G06Q 10/105 |
| 2019/0206271 A1 | 7/2019 | Cosyn et al. |

OTHER PUBLICATIONS

Angoff, "The Development of Statistical Indices for Detecting Cheaters", Journal of the American Statistical Association, vol. 69, No. 345, Mar. 1974, pp. 44-49.

Bellezza et al., "Detection of Cheating on Multiple-Choice Tests by Using Error-Similarih. Analysis", Teaching of Psychology, vol. 16, No. 3, Oct. 1989, pp. 151-155.

Disario et al., "Applying Monte Carlo Simulation to Determine the Likelihood of Cheating on a Multiple-Choice Professional Exam", CS-BIGS, vol. 3, No. 1, pp. 30-36.

Fendler et al., "Observing and Deterring Social Cheating on College Exams", IJ-SoTL, vol. 12, No. 1, Article 4, 2018. pp. 1-9, https://doi.org/10.20429/ijsotl.2018.120104.

Frary et al., "Indices of Cheating on Multiple-Choice Tests", Journal of Educational Statistics, vol. 2, No. 4, Winter 1977, pp. 235-256.

Harpp et al., "Crime in the Classroom—Detection and Prevention of Cheating on Multiple-Choice Exams", Journal of Chemical Education, vol. 70, No. 4, Apr. 1993, pp. 306-311.

Harpp et al., "Crime in the Classroom—Part II. An Update", Journal of Chemical Education, vol. 73, No. 4, Apr. 1996, pp. 349-351.

Lin et al., "Catching Cheating Students", Economica, vol. 87, Oct. 2020, pp. 885-900, doi:10.1111/ecca.12331.

Maynes, "Detecting Potential Collusion among Individual Examinees using Similarity Analysis", Handbook of Quantitative Methods for Detecting Cheating on Tests, Oct. 14, 2016, pp. 47-69.

McManus et al., "Detecting cheating in written medical examinations by statistical analysis of similarity of answers: pilot study", BMJ, vol. 330, May 7, 2005, pp. 1064-1066.

Richmond et al., "The detection of cheating in multiple choice examinations", arXiv:1504.00824v1 [physics.soc-ph], Apr. 3, 2015, 20 pgs.

Romero et al., "On the Optimality of Answer-Copying Indices: Theory and Practice", Journal of Educational and Behavioral Statistics, vol. 40, No. 5, 2015, pp. 435-453, DOI: 10.3102/1076998615595628.

Sotaridona et al., "Detecting Answer Copying Using the Kappa Statistic", Applied Psychological Measurement, vol. 30 No. 5, Sep. 2006, pp. 412-431, DOI: 10.1177/0146621606288891.

Van Der Ark et al., "Detecting Answer Copying Using Alternate Test Forms and Seat Locations in Small-Scale Examinations", Journal of Educational Measurement, vol. 45, No. 2, Summer 2008, pp. 99-117.

Van Der Linden et al., "Bayesian Checks on Cheating on Tests", Psychometrika, vol. 80, No. 3, Sep. 2015, pp. 689-706, doi: 10.1007/s11336-014-9409-x.

Wesolowsky, "Detecting excessive similarity in answers on multiple choice exams", Journal of Applied Statistics, vol. 27, No. 7, Aug. 2, 2000, pp. 909-921, DOI: 10.1080/02664760050120588.

International Preliminary Report on Patentability for International Application PCT/US2021/071895, Report issued Apr. 13, 2023, dated Apr. 27, 2023, 05 Pgs.

\* cited by examiner

| Collusion Group and FPR Thresholds | | | | |
|---|---|---|---|---|
| class size | first threshold | second threshold | third threshold | fourth threshold |
| 25-27 | 1.38 | 1.89 | 2.06 | 2.36 |
| 28-32 | 1.36 | 1.80 | 1.96 | 2.30 |
| 33-37 | 1.35 | 1.78 | 1.91 | 2.23 |
| 38-42 | 1.32 | 1.73 | 1.86 | 2.20 |
| 43-47 | 1.32 | 1.72 | 1.84 | 2.10 |
| 48-54 | 1.31 | 1.69 | 1.81 | 2.06 |
| 55-64 | 1.31 | 1.68 | 1.78 | 2.00 |
| 65-74 | 1.30 | 1.66 | 1.76 | 2.00 |
| 75-84 | 1.29 | 1.64 | 1.74 | 1.98 |
| 85-94 | 1.29 | 1.63 | 1.72 | 1.95 |
| 95-104 | 1.29 | 1.61 | 1.71 | 1.91 |
| 105-114 | 1.29 | 1.61 | 1.70 | 1.91 |
| 115-124 | 1.29 | 1.60 | 1.69 | 1.91 |
| 125-134 | 1.29 | 1.60 | 1.69 | 1.90 |
| 135-144 | 1.28 | 1.59 | 1.69 | 1.89 |
| 145-154 | 1.28 | 1.58 | 1.69 | 1.89 |
| 155-164 | 1.27 | 1.57 | 1.68 | 1.88 |
| 165-174 | 1.27 | 1.57 | 1.67 | 1.87 |
| 175-184 | 1.27 | 1.57 | 1.67 | 1.86 |
| 185-194 | 1.27 | 1.57 | 1.67 | 1.86 |
| 195-204 | 1.26 | 1.56 | 1.66 | 1.86 |
| 205-214 | 1.26 | 1.56 | 1.65 | 1.84 |
| 215-224 | 1.25 | 1.56 | 1.64 | 1.83 |
| 225-234 | 1.25 | 1.56 | 1.63 | 1.82 |
| 235-244 | 1.25 | 1.56 | 1.63 | 1.82 |
| 245-250 | 1.24 | 1.54 | 1.61 | 1.78 |
| >250 | 1.23 | 1.50 | 1.60 | 1.70 |

*FIG. 10*

Complexity vs recall

| mean complexity | mean recall |
|---|---|
| 2 | -1% |
| 3 | 10% |
| 4 | 19% |
| 5 | 27% |
| 6 | 34% |
| 7 | 40% |
| 8 | 45% |
| 9 | 50% |
| 10 | 54% |
| 11 | 58% |
| 12 | 61% |
| 13 | 64% |
| 14 | 67% |
| 15 | 70% |
| 16 | 72% |
| 17 | 74% |
| 18 | 76% |
| 19 | 78% |
| 20 | 80% |
| 21 | 82% |
| 22 | 83% |
| 23 | 85% |
| 24 | 86% |
| 25 | 88% |
| 30 | 92% |
| 35 | 93% |
| 40 | 92% |

FIG. 14

SYSTEMS AND METHODS FOR DETECTING COLLUSION IN STUDENT TESTING USING GRADED SCORES OR ANSWERS FOR INDIVIDUAL QUESTIONS

RELATED APPLICATIONS

The present application claimed priority to U.S. Provisional Patent Application No. 63/091,758 to Biggin et al., filed Oct. 14, 2020, the disclosure of which is hereby incorporated by reference in its entirety.

FIELD OF THE INVENTION

The present disclosure relates generally to detecting collusion on student academic tests and more specifically to determining groups of students that have colluded and confidence levels of such assignments.

BACKGROUND

Historically examinations were given in person with proctors present in the room to prevent or greatly limit cheating by students. There has, however, over the last decade been an increasing shift towards online exams taken remotely by students in their homes, which has made strict proctoring of examinations challenging. The COVID-19 pandemic has only accelerated this trend and as a result, cheating by students has increased greatly. Counting high school, undergraduate college and post graduate studies, education is a major industry involving the majority of the younger members of our society. It is also an increasing financial burden on the younger generation. When students cheat, they improve their grade and thus their future career prospects and income, and at the same time they reduce the grades obtained by honest students as grades tend to be awarded based on relative performance in the class. Thus, the integrity of diplomas and degrees awarded is degraded by cheating with negative impacts for society.

Statistical methods have been used for several decades to detect cheating after an exam has been taken, which could be termed post exam proctoring. But these methods are only applicable to multiple choice exams and have been tuned to work well on only specific exam formats, including national exams such as the SAT (e.g. Angoff (1974) J. Am. Stat. Assoc., 69: p. 44-49; Wesolowsky (2000) J. Appl. Stat., 27: p. 909-921; McManus et al. (2005) BMJ, 330: p. 1064-1066; Romero et al. (2015) DOI: 10.3102/1076998615595628; Fendler et al (2018) DOI: 10.20429/ijsotl.2018.120104). What is needed are approaches that can be used on a vastly wider array of exams and implemented easily by all instructors. Exams set by each instructor have idiosyncratic differences in the number and difficulties of questions, scoring and grading methods, as well as class size. A general method to detect cheating must be able to account for this variation.

SUMMARY OF THE INVENTION

Systems and methods for determining collusion in student academic exams are disclosed. One embodiment includes:
  receiving, by a collusion detection system, an input electronic file including a set of academic test data representing results of at least one student exam, where the academic test data includes student identifiers associated with students taking the at least one student exam, question scores associated with each student identifier, and the total score for each student on the test,
  calculating an identity score for each pair of students, the identity score representing a quantified similarity of question scores of the students within each pair,
  determining a maximum identity score for each student, which is the highest identity score of all pairs of students including that student,
  generating a normalized collusion score for each student from the maximum identity score of that student by:
  subtracting from the maximum identity score an average identity score to generate an identity metric for that student, where the average identity score is an estimated average of identity scores associated with pairs of students including that student,
  constructing a ranked list of students where the students are ranked by total test score, and
  dividing the identity metric of that student by a local average identity metric to generate a normalized collusion score for that student, where the local average identity metric is an estimated average of a set of identity metrics for a subset of students who lie adjacent to one another on the total test score ranked list,
  writing student identifiers and normalized collusion scores associated with student identifiers to an output electronic file by the collusion detection system.

In another embodiment, receiving, by a collusion detection system, an input electronic file including a set of academic test data representing results of at least one student exam includes:
  receiving, by a collusion detection system, the input electronic file from a client device over a network, and the method further includes:
  sending the output electronic file to the client device over the network.

Another embodiment includes displaying student identifiers and associated normalized collusion scores in a visual format on a display screen on the client device.

Another embodiment includes determining collusion groups from the normalized collusion scores by:
  identifying pairs of students with a first member of the pair having a normalized collusion score above a first predetermined threshold and the second member of the pair having a normalized collusion score above a second predetermined threshold, where the second predetermined threshold is greater than the first predetermined threshold,
  combining identified pairs of students into provisional groups when pairs share one or more members,
  creating collusion groups from provisional groups by, for each provisional group, combining an additional provisional group into the provisional group if two members of the provisional group have a third member of the additional provisional group as a second partner and the normalized collusion score of the third member is greater than the second predetermined threshold, where the third member is a second partner to each of the two members when they have the second highest identity score in pairs with each of the two members, where the collusion groups are referenced by student identifiers for the students in each group, and
  writing collusion groups including student identifiers of students associated with each collusion group to the output electronic file.

In another embodiment, calculating an identity score for each pair of students further includes:
  for each pair of students:
  counting each question on the at least one student exam where the students provided the same answer and counting each question on the at least one student exam where the students received the same score, adding the counted questions to generate an identity score as a sum.

In another embodiment, calculating an identity score for each pair of students further includes:

for each pair of students, calculating a Pearson correlation between question scores between the students of the pair as the identity score.

Another embodiment includes administering control exams to groups of students, calculating the first and second predetermined thresholds based on results of the control exams and knowledge of the prevalence of cheating on the control exams.

In another embodiment, the academic test data is in numerical format representing a graded number of points each student received for each answered question.

In another embodiment, the academic test data is in multiple choice format representing an answer each student provided for each answered question.

Another embodiment includes manually comparing answers of students within each collusion group.

In another embodiment, there are at least 25 students.

Another embodiment includes removing from consideration students whose test scores are 5% or less of the highest test score.

In another embodiment, at least some rows of academic test data are associated with a student identifier and the method further includes removing from consideration rows of academic test data that have no associated student identifier and rows of academic test data that have the same duplicated student identifiers.

Another embodiment includes estimating a false positive rate for each collusion group based on the highest collusion score among students in the collusion group and the relation of whether the highest collusion score is greater than the second predetermined threshold, a third predetermined threshold, and a fourth predetermined threshold, where the fourth predetermined threshold is greater than the third predetermined threshold and the third predetermined threshold is greater than the second predetermined threshold, and writing the false positive rate for each collusion group to the output electronic file.

In another embodiment, estimating a false positive rate for each collusion group utilizes a large dataset of empirical data including past exams to determine the first, second, third, and fourth predetermined thresholds.

In another embodiment, estimating a false positive rate for each collusion group utilizes a large dataset of synthetic data created to have similar statistical characteristics to one or more exams.

In another embodiment, the set of academic test data represents results of at least two student exams, the student exams having associated student identifiers in common with each other.

Another embodiment includes calculating a combined complexity value representing a quantified amount of question score information in the academic test data and indicative of greater accuracy in placing students in collusion groups by:

calculating complexity of each question within the academic test data sing a metric based on the probability that two students obtain the same score, where the probability that two students obtain the same score is the sum of squares of observed frequencies of each score, combining the complexity values of each question to generate a combined complexity value for all questions, writing an indication whether the combined complexity value is high enough for useful analysis and at least one suggestion for increasing complexity to the output electronic file.

In another embodiment, calculating complexity of each question within the academic test data includes:

calculating complexity of each question as log 10 (1/probability that two students obtain the same score), and adding together the complexity of each question for all questions to generate the combined complexity value.

In another embodiment, the estimated average of identity scores is the median of identity scores and the estimated average of a set of identity metrics is the median of identity metrics.

In another embodiment, a collusion detection system includes:

a processor, a non-volatile memory including a collusion detection application, wherein the processor is configured by the collusion detection application when executed to receive an input electronic file including a set of academic test data representing results of at least one student exam, where the academic test data includes student identifiers associated with students taking the at least one student exam, question scores associated with each student identifier, and the total score for each student on the test, calculate an identity score for each pair of students, the identity score representing a quantified similarity of question scores of the students within each pair, determine a maximum identity score for each student, which is the highest identity score of all pairs of students including that student, generate a normalized collusion score for each student from the maximum identity score of that student by:

subtracting from the maximum identity score an average identity score to generate an identity metric for that student, where the average identity score is an estimated average of identity scores associated with pairs of students including that student, constructing a ranked list of students where the students are ranked by total test score, and dividing the identity metric of that student by a local average identity metric to generate a normalized collusion score for that student, where the local average identity metric is an estimated average of a set of identity metrics for a subset of students who lie adjacent to one another on the total test score ranked list, write student identifiers and normalized collusion scores associated with student identifiers to an output electronic file by the collusion detection system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIG. 10 is a table showing collusion score thresholds for different class sizes in accordance with embodiments of the invention.

FIG. 14 shows complexity values and corresponding recall in accordance with embodiments of the invention.

DETAILED DISCLOSURE OF THE INVENTION

Figure 1:
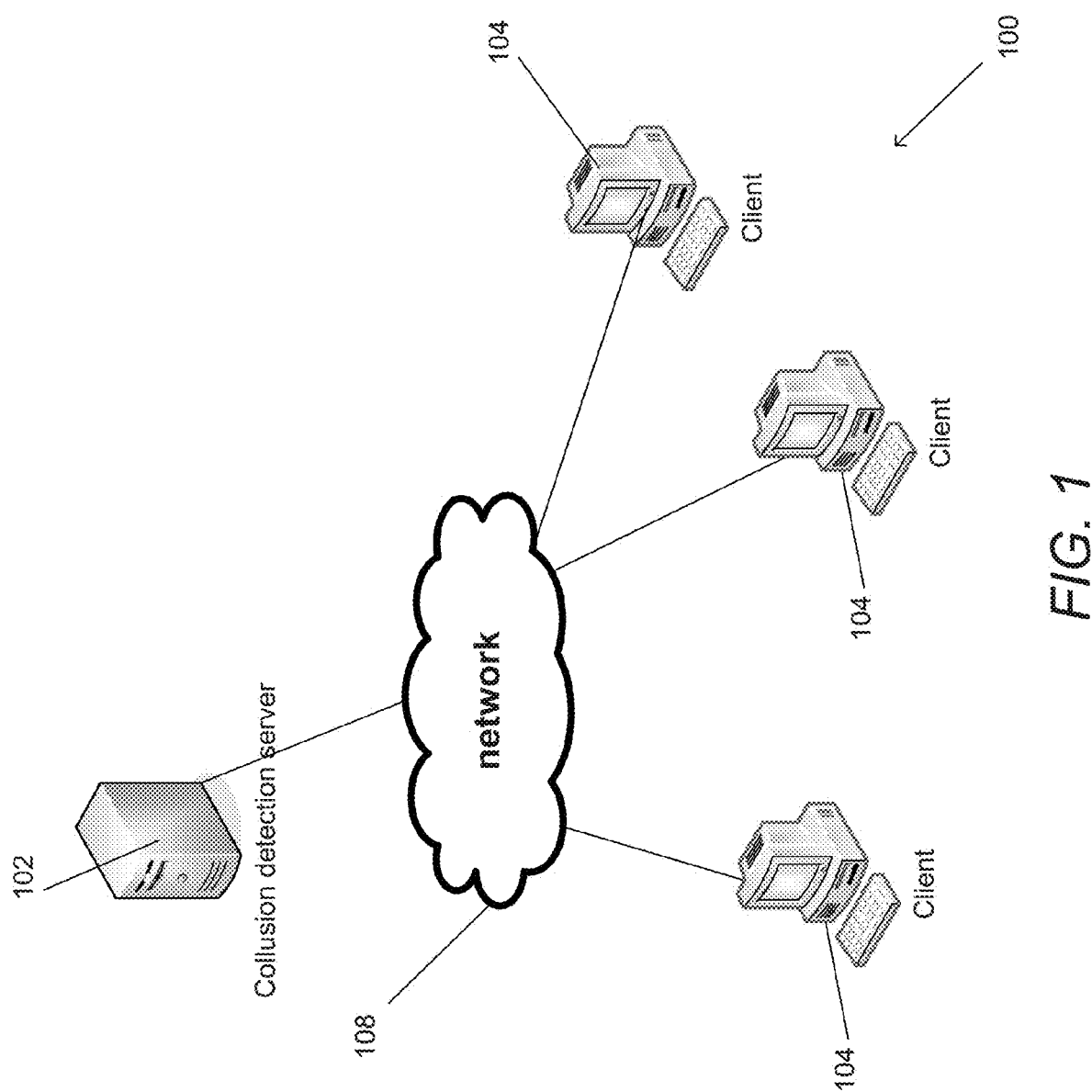
FIG. 1 conceptually illustrates a collusion detection system utilizing a client-server system in accordance with embodiments of the invention.

Some prior methods are known in the art to attempt to detect collusion, or collaborative cheating, by students on multiple choice exams where the choice of answer is known, but they are not based solely on the number of identical question scores. Previous techniques have typically required attention and modifications that are specific to each exam and/or class to achieve usable results.

The disclosure of the present application includes description of systems and methods for detecting collusion in student academic testing groups. Embodiments of the invention can provide a determination of which students are likely to have colluded, or collaborated together in answering questions, on a particular examination. In many embodiments of the invention, such determination can be generated from the graded question scores given to or the answer choices provided by each student for each question on the examination. A series of statistical calculations can be performed to compute a normalized metric, referred to here as a Collusion Score, that can then be used to put students into groups whose scores for each question on an exam are unusually identical compared to those of other students who obtained a similar total score on the exam. Analysis by the inventors establishes that groups of students known to have colluded based on forensic analysis of their written answers have significantly more questions for which their scores are identical than pairs of honest students who did similarly well on the exams. The student collusion detection technique in accordance with embodiments of the invention compares the scores for all questions for identity irrespective of whether the answer was fully correct, partially correct or wrong. Student collusion detection's normalized metric greatly reduces various biases that have plagued earlier efforts to detect collusion from exam data and allows curated lists of students likely to have cheated to be provided for all exams, irrespective of class size or other variables. Student collusion detection places those students considered likely to have colluded into Collusion Groups and provides an estimate of the false positive rate based on rates observed empirically in strictly proctored exams where collusion is unlikely to have occurred. False positive rates can be separately estimated by synthetically generating question scores or answers for many tests that have the same characteristics of a given exam but in which the answers for each student are independent from those of all other students. Empirical and synthetic estimates of false positive rates are found to broadly agree, supporting the accuracy of these methods.

Many embodiments of the invention may utilize generalized and/or specialized computer hardware implementing one or more processes as described below to convert data input as sets of question scores to output data as Collusion Scores indicative of suspected collaborative cheating between students taking one or more tests. Such hardware may include one or more computing devices that each can include memory, one or more processors, and/or one or more network interfaces.

In further embodiments, computer hardware and/or processes may be implemented as a web service and/or web application and/or associated hardware and/or network systems. In some embodiments, input data can be captured in a web form or uploaded as a text or data file to a web site.

In additional embodiments, output data is provided within a web page or as a downloadable text or data file linked from a web site. While specific numbers, ranges, and mathematical operations may be described below, one skilled in the art will recognize that they may vary in accordance with different embodiments of the invention as appropriate to a particular application.

Definitions

The following discussion will utilize the following terms.

Question Score=A question score can be expressed in a variety of ways. The score may be a numeric value representing the graded number of points that the student was awarded. Alternatively, for multiple choice questions the score may be any one letter/word of text representing the student's choice of answer, for example "a", "b", "c", "d", or "e"; or "true" or "false", so long as the same type of score (e.g., graded points or provided answer) is used for all students on a particular question. The score can also be captured by other features of a provided answer or other metrics that are known in the art (e.g., the answer itself, a grading rubric, etc.). A single exam be represented by a mix of both graded points and answer choices depending on the number and types of questions asked.

Test Score=the total numeric score awarded to a student for a complete exam.

Test Score rank=a student's rank within the class by Test Score, where rank 1 is the largest Test Score.

Identity Score (IS)=a metric that quantifies similarity in Question Scores between two students. This can be, for example, the number of identical Question Scores between a pair of students, a Pearson correlation in graded scores, a text similarity of provided answers, etc.

Max IS=the maximum IS for a student out of the set of ISs for that student paired with each of the other students in the class.

Identity Metric (IM)=Max IS−50th median IS, i.e., the subtraction from the Max IS of the median IS from the set of IS values for that student paired with each of the other students in the class.

Collusion Score (CS)=IM/(local median of IMs where students are ranked by TS).

CS rank=a student's rank within the class by CS, where rank 1 is the largest CS.

Student=The student being considered.

First Partner=The member of the class with the largest number of Question Scores that are identical with the student. The number of identical Question Scores for the Student-First Partner pair defines the Max IS.

Second Partner=A student's partner in the class with the second largest IS.

Collusion Group=A small group of two or more students that result from joining Student/partner pairs who share a member and who have CSs typical of students who collude.

Complexity=The amount of useful Question Score information in an exam, which is a function of both the number of Question Scores and the frequency with which a class obtain similar or different scores on each question. The higher the Complexity the greater the percent of colluding students who will be placed into Collusion Groups.

False positive rate (FPR)=The percent of students placed into one of three Collusion Group bins based on an analysis of a large set of strictly proctored examinations taken in person as a control group. The students are assumed not have been able to collude in these proctored exams, providing an estimate of the number of students falsely identified by student collusion detection.

Collusion Detection Systems

Systems and methods for student collusion detection in accordance with embodiments of the invention may be implemented on computer systems for efficient processing. Processes such as those discussed further below may be performed on a collusion detection system by providing an input electronic data file including student testing data.

In some embodiments, the student testing data may be formatted in a table where each student's data entry is a row, and where the columns include at least student identifier (ID), student's total score, and multiple additional columns for Question Scores associated with that student's answers to questions on an exam. The collusion detection system can output an electronic data file with the results of processing. In several embodiments, the output is formatted as a table where rows list information for student-partner pairs. Columns can include any or all of: if the student belongs to a Collusion Group and if they do, the group's estimated false positive rate; the ID's of the student and their First Partner; the pair's CS and CS rank; the student's Test Score and Test Score rank; and/or further information on the First Partner.

Where more than one exam is provided, the students' Test Scores can be the sum of their Test Scores entered for each exam. In addition, a Second Partner can be defined who has the second highest number of identical Question Scores with the student. Information on this Second Partner can be provided as it is used by the clustering method to sort students into Collusion Groups. Furthermore, the rows are ranked by student CS and Collusion Group.

Additional outputs can include a histogram of the CSs of the query exam compared to a histogram of CSs for model of a similar size class who have not colluded; a list of the Collusion Groups, the IDs of their members and their CSs; a bar graph of the CSs, ordered by the students' Test Score rank; and for every Collusion Group, a histogram of the number of Question Scores identical between a designated member of the group and each other student in the class, where the designated group member is the one with the highest CS.

A collusion detection system utilizing a client-server system in accordance with embodiments of the invention is illustrated in FIG. 1. The input electronic data file can be captured by or entered into a client device 104. The client device can communicate the data to a collusion detection server 102 over a network 108. The collusion detection server 102 may perform processes such as those discussed further below to transform the input data to the output data and provide output files and/or visualizations. The output can be sent back to the client device 104.

Figure 2B:
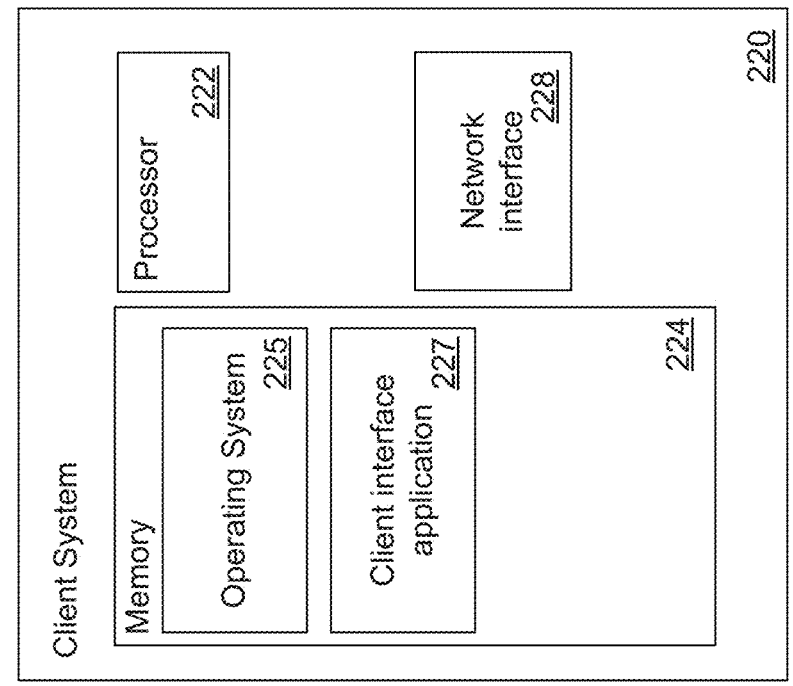
FIG. 2B conceptually illustrates a client device in a collusion detection system in accordance with embodiments of the invention.
Figure 2A:
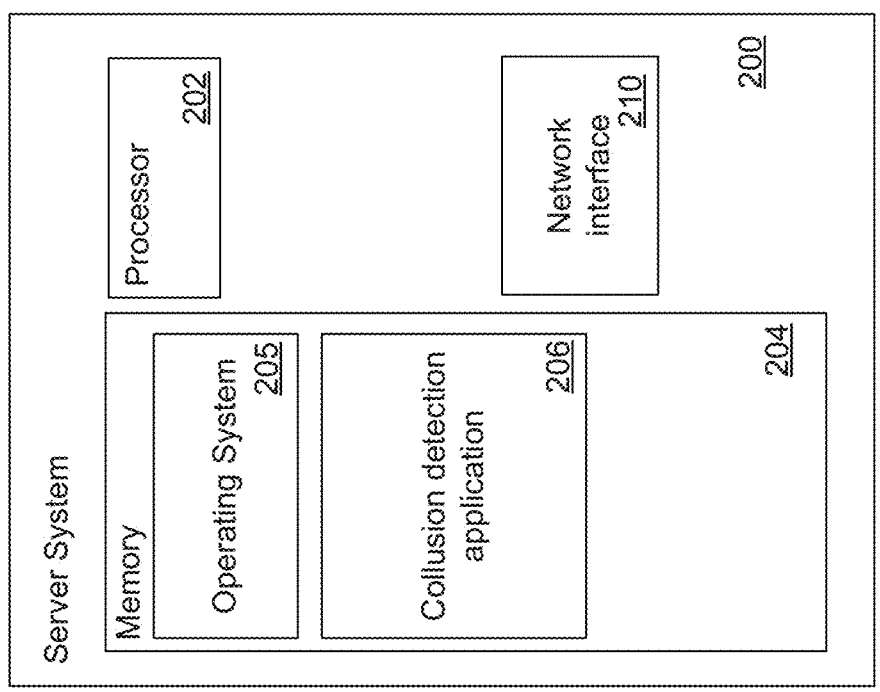
FIG. 2A conceptually illustrates a server in a collusion detection system in accordance with embodiments of the invention.

A server system 200 in accordance with several embodiments of the invention is illustrated in FIG. 2A. The server system 200 includes a processor 202, and network interface 210. In non-volatile memory it can store an operating system 205 and collusion detection application 206.

A client system 220 in accordance with several embodiments of the invention is illustrated in FIG. 2B. The client system 220 includes a processor 222, and network interface 228. In non-volatile memory it can store an operating system 225 and client interface application 227.

While specific architectures are discussed above with respect to FIGS. 1, 2A, and 2B, any of a variety of architectures may be utilized in accordance with embodiments of the invention. For example, the server may be implemented as a web server and the client may execute a web browser. The input data file may be uploaded through the web browser and sent to the server. The output data file may be returned through the web browser as a download. Other transport protocols may be used in other embodiments. In some other embodiments all the processing can be performed on a client device and the data does not need to be sent over a network to a server. Alternatively, current online exam or grading platforms might implement collusion detection system on their servers, in which case the input data can be generated within the server system. For example, the students' answers can provided to the server and the server performs "grading" to assign question scores to each answer. Communication with the client system can provide metadata about the exam to aid generation of the input data and to access the output data. Collusion scores are discussed next.

Collusion Scores

Techniques for student collusion detection as described here are a form of outlier analysis. Every student is affixed with a single value representing the likelihood that they colluded on exam answers with one or more other students in the class. Initially this is a maximum Identity Score (Max IS), which is processed via an Identity Metric (IM) to yield a Collusion Score (CS), one CS per student. The Max IS, IM, and CS refer to the relationship between each student and whichever other student shares the largest number of identical Question Scores. Thus, each student is paired with one other student in a so-called Student-First Partner pair.

In several embodiments of the invention, Student-First Partner pairs can be identified as follows. First for each student, the number of identical Question Scores in common with every other student is calculated to produce a series of ISs—one for each pair including that student. For a class of size N, there are thus $(N^2/2)-N$ non-redundant ISs.

In various embodiments of the invention, IS may be determined in different ways, e.g., in how similarity is found between Question Scores of different students.

Figure 3:
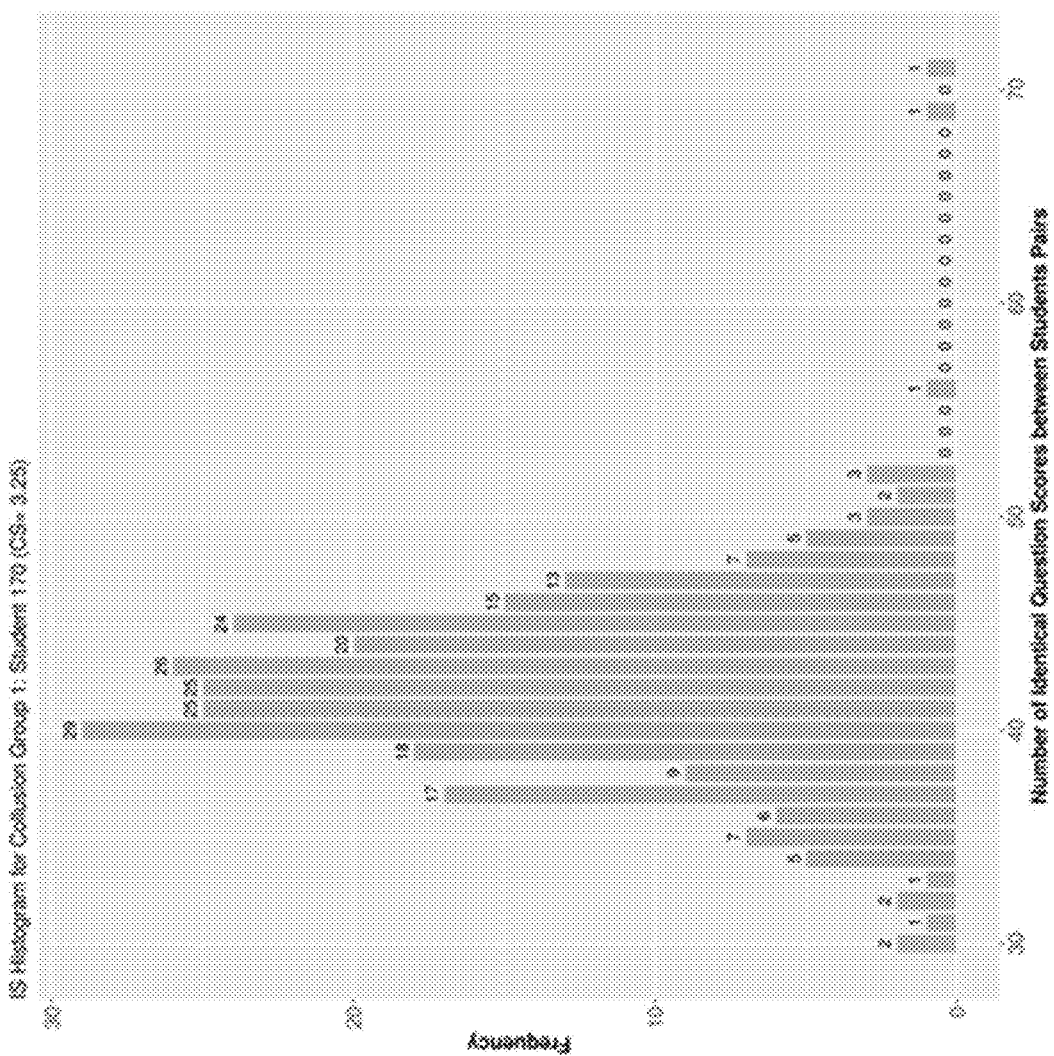
FIG. 3 illustrates a histogram of identity scores for an example student in accordance with embodiments of the invention.

The histogram in FIG. 3 shows an example for student ID:170 paired with each of the other 268 students in a class. Student ID:170's First Partner is defined by the right-hand most bar in the plot having the highest IS (Max IS=71). In this example, this Student-First Partner pair and also the student represented by the second most right-hand bar (IS=69) were shown to have colluded by subsequent forensic analysis of their exam answers. All three of these students confessed to cheating. Strong outliers on such IS histograms have been found to be highly indicative of collusion. Additional discussion on processes for determining Collusion Scores will be presented further below.

In contrast to previous collusion detection methods, the techniques discussed here only require the graded scores or provided answer choices of students for each question. Previous methods are limited to multiple choice exams where the students' choice of answer has been recorded. These prior methods require the exact response of students, such as which particular wrong answer students give. The techniques here are thus more widely applicable as many exams are not multiple choice. A very wide array of exams record students' graded score for every question, including exams that require written responses of one or more sentences, calculations, drawn chemical structures etc.

BIAS Mitigation

Figure 4:
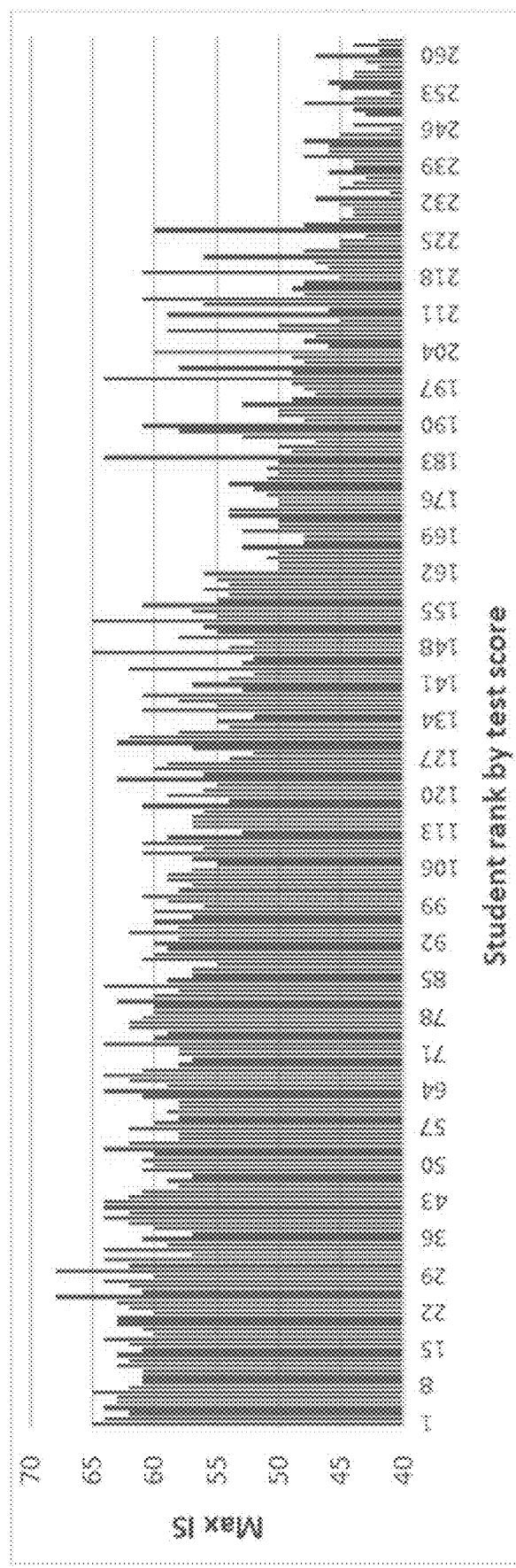
FIG. 4 illustrates a test score rank list of an example group of students in accordance with embodiments of the invention.

Max ISs can be powerful in defining collusion as they show the largest discrimination between students who have colluded and those who have not. The absolute values of Max ISs, however, may not definitively determine the likelihood that students have colluded because Max ISs can be subject to two systematic biases and two occasional biases. The first systematic bias is a "Test Score rank bias". Students who answer most questions correctly typically have higher Max ISs than students who perform less well on tests. This is shown in FIG. 4 by the systematic reduction in Max ISs from students at the top of the Test Score rank list (left, rank 1) to those at the bottom of the list (right, rank 269).

Figure 5:
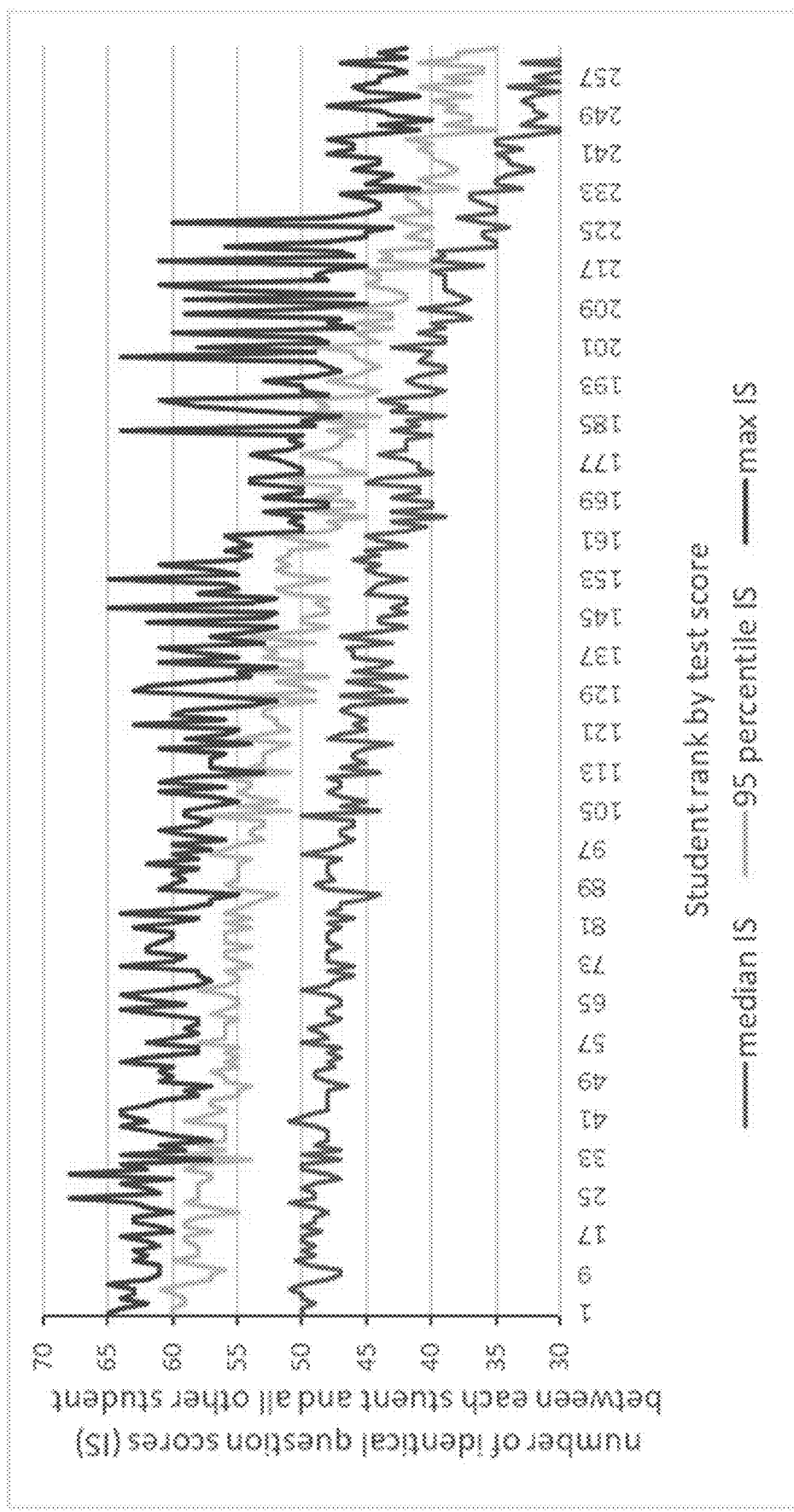
FIG. 5 illustrates for an example group of students the median IS, 95th percentile IS, and Max IS for each student, ranked by Test Score in accordance with embodiments of the invention.

The second systematic bias is a "student specific bias". The plot in FIG. 5 shows for an example group of students the median IS, 95th percentile IS, and Max IS for each student, ranked by Test Score. The student specific bias can be seen by the similarity in the up and down fluctuations of the median IS and 95th percentile IS trend lines (FIG. 5, yellow and blue lines). Collusion mostly occurs between small groups of 2-5 students. Therefore, the co-fluctuation of the median and 95th percentile trend lines cannot be due to collusion. The student specific bias results because neighboring students on the Test Score rank list answer either slightly fewer or slightly more of the "easy" questions that most students get correct. Consequently, neighboring students will tend to share slightly more or slightly fewer scores with the other class members.

The Max IS trend line follows the median IS and 95th percentile IS lines in many regards, but it also captures collusion among a very small percent of students, as evidenced by the additional stronger peaks (FIG. 5, top red line). To derive a metric whose absolute value is indicative of collusion, two transformation can be used. First an identity Metric (IM) is calculated for each student i as:

$$IM_i = (\text{Max } IS_i) - (\text{median } IS_i)$$

The mitigation of bias that results from this transformation is shown by the lower Pearson correlations (r) for IMs vs median ISs and IMs vs 95th percentile ISs than for and median ISs vs 95th percentile ISs and median ISs vs Max ISs.

TABLE 1

| Median IS vs 95th percentile IS | r = 0.98 |
| Median IS vs Max IS | r = 0.87 |
| IM vs Median IS | r = 0.06 |
| IM vs 95th percentile IS | r = 0.10 |

Note that here a subtraction is used to determine IM rather than a ratio (i.e. not (Max $IS_i$)/(median $IS_i$)) because a subtraction leads to a metric that gives equal weight to colluding pairs who copy the same number of answers, irrespective of their position on the Test Score rank list. A ratio by contrast would give more weight to pairs at the bottom of the rank list than those at the top if both pairs copied the same number of questions. The ratio metric was found to reduce detection of collusion among students who score more highly on tests.

Note also that for large classes, IM values can be calculated as $IM_i = (\text{Max } IS_i) - (95\text{th percentile } IS_i)$ or other similar variants and successfully identify a large percent of known Collusion Groups at a low FPR. For classes of one hundred students or less, however, such approaches can lead to too few IM and CS values, and as a result a reduced accuracy in detecting collusion. For robustness across all class sizes, several embodiments of the invention use a single IM calculation method: $IM_i = (\text{Max } IS_i) - (\text{median } IS_i)$, though averages other than the median (e.g., mean, mode, etc.) could be used as could other percentiles close to the median.

Figure 6:
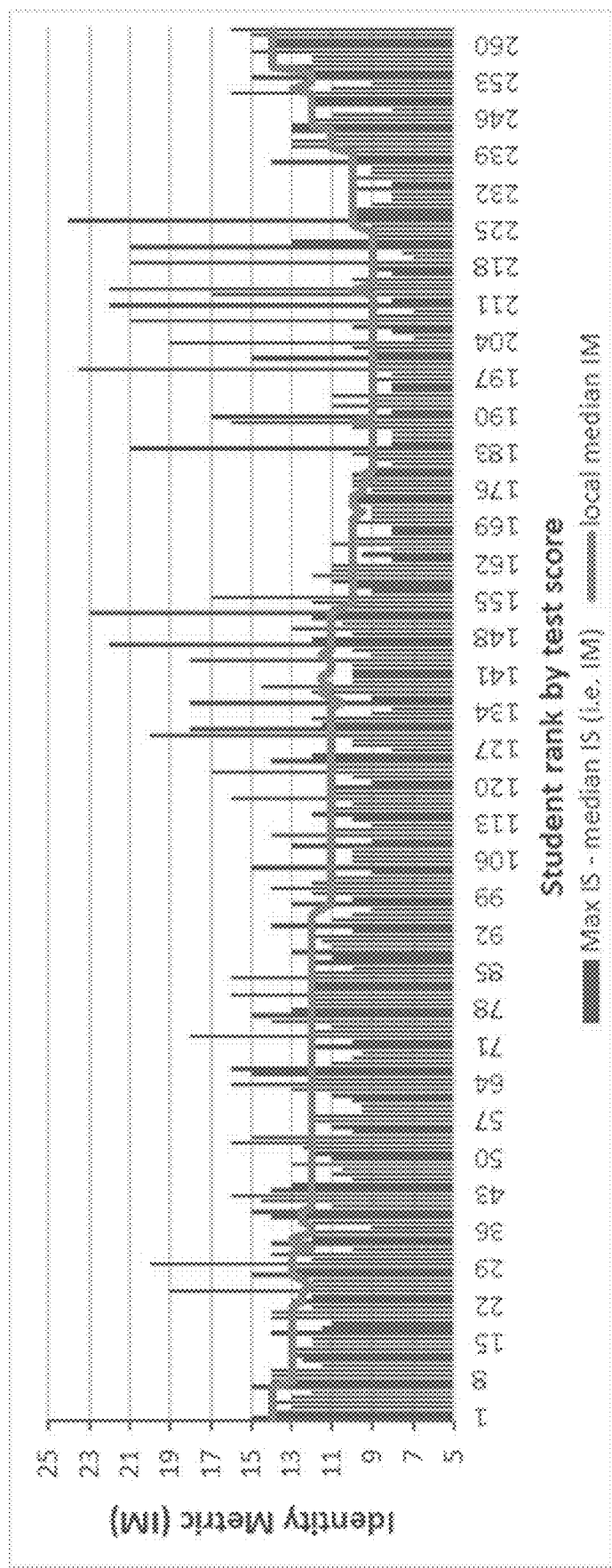
FIG. 6 illustrates for an example group of students an identity metric for each student, ranked by Test Score in accordance with embodiments of the invention.

Although the Pearson correlation analyses above show that IMs have a reduced bias compared to Max ISs, a Test Score rank bias may remain, as shown by the local median of IMs from sliding windows (FIG. 6, horizontal line in orange). In addition to a steady decline in the local median IMs from ranks 1 through 220, an increase in IMs is observed below rank 220 that reflects the fact that the worst performing students share many Question Scores of zero.

To remove this residual Test Score rank bias CSs can be calculated as:

$$CS_i = IM_i / (\text{local median } IM_i)$$

Note that the denominator could comprise other measures of the local IM average (e.g., mean, mode, etc.) or other local percentiles that are similar to the median.

Figure 7:
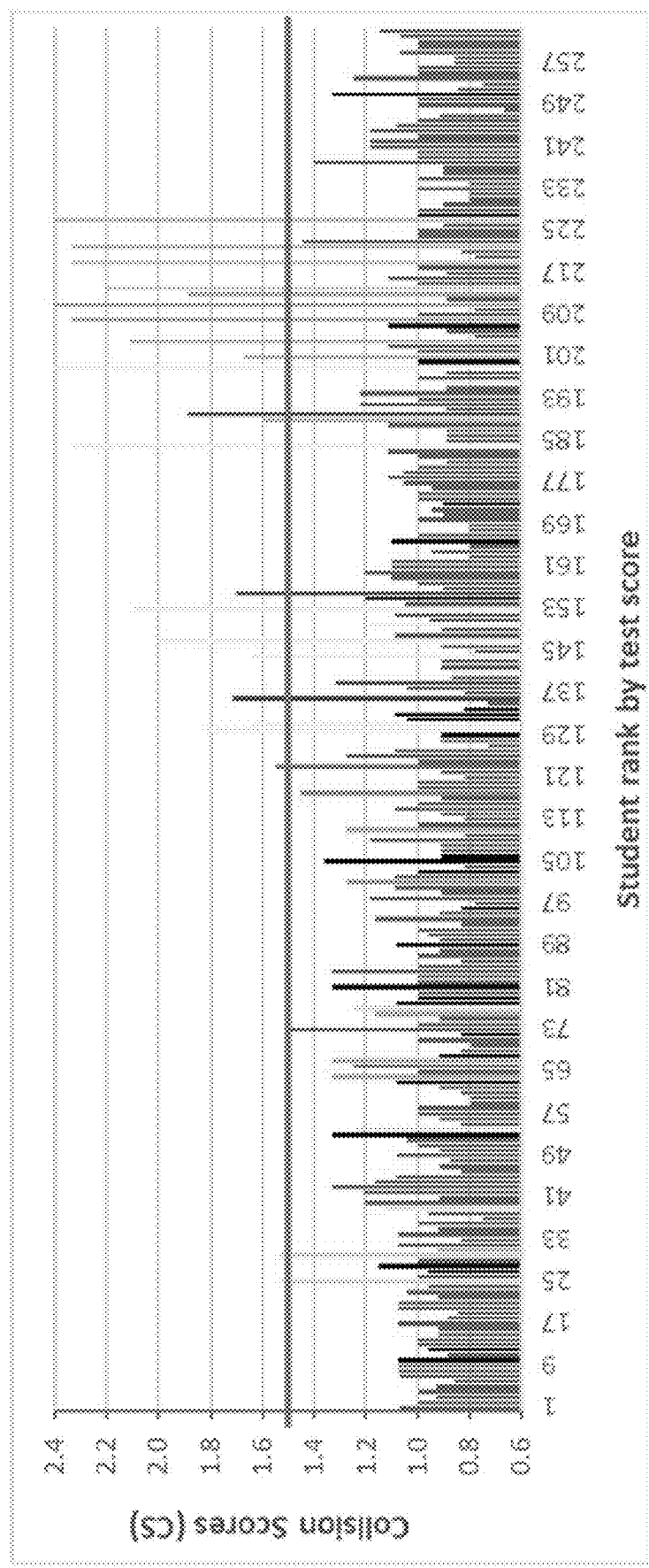
FIG. 7 illustrates for an example group of students an collusion score for each student, ranked by Test Score in accordance with embodiments of the invention.

The bar plot in FIG. 7 shows CSs ordered by Test Score rank. Colored bars show students who were validated as colluding by forensic analysis of written answers (i.e., true positives). Student-First Partner pairs belonging to the same Collusion Group are shown in the same color. Student-First Partner pairs found not to have colluded because there are no unusual similarities in their written answers are shown in black (i.e. true negatives). Students whose written answers have not been forensically analyzed are in dark blue.

In addition to the above two systematic biases, two occasional sources of bias can affect a small number of students in a minority of exams.

The first of these occasional biases can result from students who score zero on most questions. Pairs of such students have aberrantly high IMs which challenge normalization by impacting the local median. This bias can be removed by the simple expedient of excluding students whose Test Scores are ≤5% of the highest Test Score obtained in the exam. Students who scores are so extremely low are assumed to be unlikely to have colluded and thus CSs are not calculated for them. Most often they are students who will later drop the class.

The second occasional bias results from clerical errors that can lead to data for one or more students being present more than once, often with similar but not identical Question Scores. If these data remained, such duplicate entries would lead to Student-First Partner pairs with high CSs and would as a result be placed in Collusion Groups. To prevent this, student collusion detection systems and methods can ignore data from any rows that share the same Student ID as well as data in any row lacking a Student ID. Student collusion detection systems and methods can list the Student ID's of any data it ignores.

Some previous collusion detection methods have taken into account that in the absence of collusion those students whose total scores on a test are more similar will have more identical answers to each question than students with very different overall scores, which is the basis for the test score rank bias. These prior methods, however, have not mitigated or normalized this bias directly by using a local median of students ranked by test score as the techniques here. Instead, various indirect procedures have been used, some based on empirical data, others based on theoretical probabilities that rely on a variety of assumptions about distribution functions etc. Most methods do not employ the test score, instead using only partially correlated surrogates, and none use the test score rank. The direct approach here of using empirical data from the exam (or combination of several exams) being analyzed is far more straight forward and much more likely to be effective in eliminating bias.

Additionally, no prior method has addressed the "student-specific bias". This failure is due in part to the fact that prior methods consider all possible pairwise combinations of students when they attempt to account for bias, whereas the detection techniques here first collapses the data down to one pair for each student (i.e. the student/1st partner pair) before bias mitigation. Mitigation of the student-specific bias is only possible after each student has been assigned a first partner.

The collusion detection techniques discussed here are unique in providing a normalized metric (i.e. CSs) that can be compared between any exams of the same class size. Further, as described in more detail later, they are unique in using subsampling of real exam data to calculate for each class size equivalent thresholds on an similarity metric (in a current implementation this metric is CSs). The normalized CSs allows the use of empirical false positive rates (FPRs) measured from a set of strictly proctored exams to estimate the empirical FPRs for all other exams irrespective of class size, number of questions, or Complexity based on students' CSs. Being able to provide FPR estimates for all exams assists instructors in determining which students' exams require their closest attention.

Collusion Groups

The students with the highest CSs are those most likely to have colluded. A list of all students in the class ranked by CS, however, does not indicate the probability that any of the students cheated or how many. Busy Instructors need guidance so that they can understand what steps/resources to devote to the issue. Embodiments of the invention include a strategy to threshold the data to provide a curated list of students likely—but not certain—to have colluded. Students likely to have colluded together are placed into a so-called Collusion Group. Further embodiments of the invention include assigning a false positive rate (FPR) to each Collusion Group. Specific processes for developing Collusion Groups in accordance with embodiments of the invention are described further below.

Figure 8:
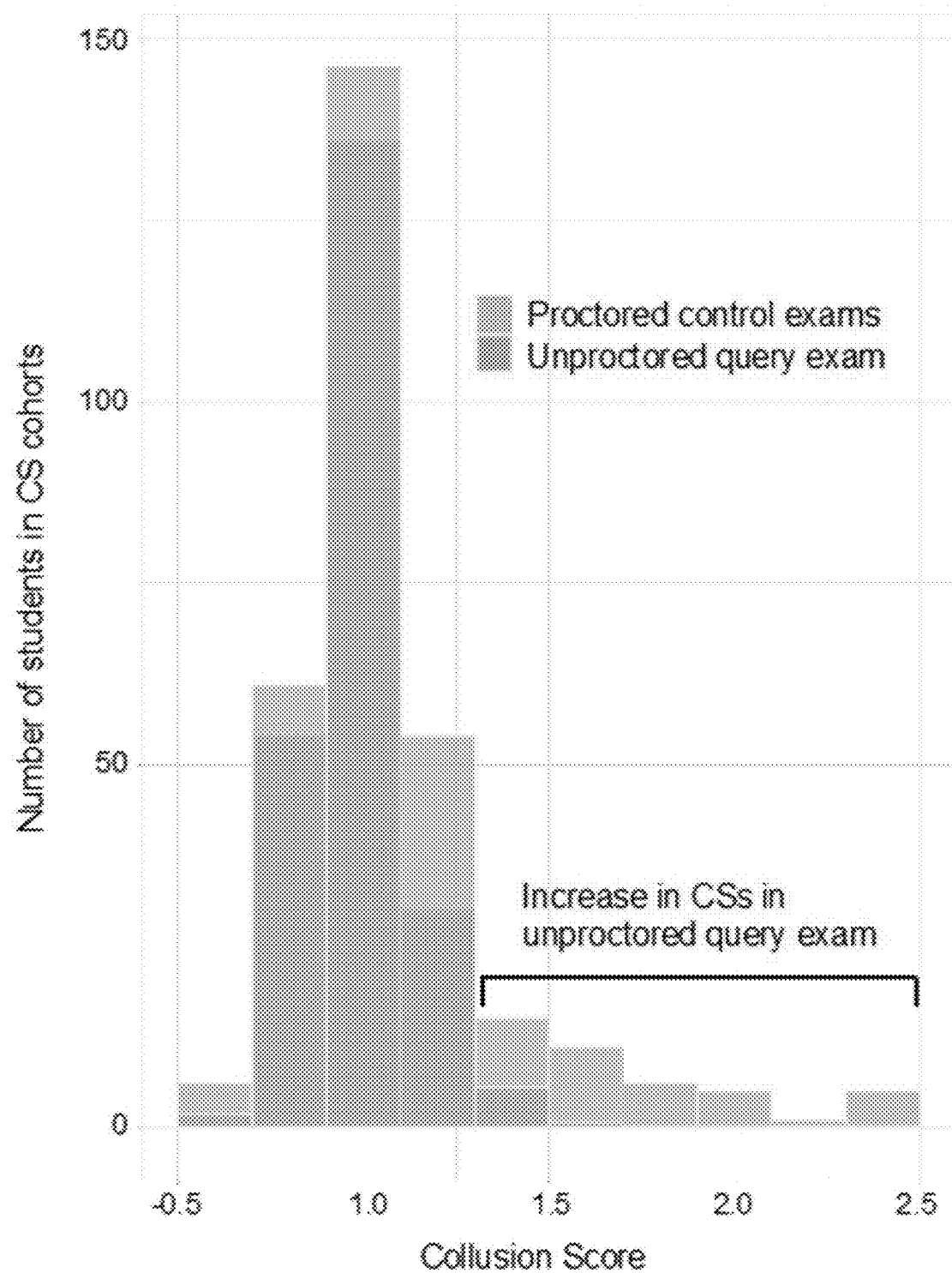
FIG. 8 is a histogram illustrating the distribution of collusion scores from 19 in-person proctored control exams to those of the unproctored, online exam in accordance with embodiments of the invention.

In several embodiments, Collusion Groups are formed using two CS thresholds. The values for these CS thresholds can be developed empirically using data from multiple classes, both data from unproctored classes for which true positives and true negatives have been independently validated as well as data from strictly proctored classes in which students are assumed not to have colluded. The thresholds provided here are from classes of more than 250 students. The two thresholds were set to find a high percent of true positives while identifying very few true negatives in the unproctored exams and also to identify very few pairs in the strictly proctored exams. In the example in the bar graph of FIG. 7, all students with CS≥1.5 were colluding true positives as were most with 1.23≤CS<1.5 (colored bars). The few students with 1.23≤CS<1.5 that were true negatives who did not collude (black bars) generally do not have a First Partner with CS>1.5. In many embodiments of the invention, when a class has more than 250 students, student collusion detection only places students into Collusion Groups where both members of a Student-First Partner pair have a CS≥1.23, which is termed the first CS threshold, and at least one member of a pair has a CS≥1.5, which is termed the second CS threshold. As a result, students who did not collude are largely excluded from Collusion Groups. Research has found that using two thresholds, one for each member of a Student-First Partner pair, provides better discrimination than using only a single CS threshold. The histogram in FIG. 8 compares the distribution of CS from 19 in-person proctored control exams to those of the unproctored, online exam from FIG. 7. There are far more students in the right tail with CS>1.5 for the unproctored exam than in the proctored exams, illustrating that high CSs imply that collusion has occurred.

Students do not always collude in pairs. They often form small groups of 3-5. Forensic comparison of written answers is greatly aided by knowledge of who are the students that copied answers together. Therefore, student collusion detection joins pairs of students that share members to form larger Collusion Groups in processes in accordance with embodiments of the invention that will be described further below.

The first and second CS thresholds, i.e. those used to place students into Collusion Groups, can be selected to establish a 0.75% overall FPR in a large set of proctored exams, or approximately one pair of falsely identified students per 266 students. The third and fourth CS thresholds defined in several embodiments of the invention can be used to divide Collusion Groups into three FPR bins of 0.5% FPR, 0.2% FPR and 0.05% FPR. As will be discussed further below, FPR's can be calculated from tested control groups of strictly proctored control exams. To maintain these FPRs for classes smaller than 250, subsampling analyses show that slightly different CSs are required for the four CS thresholds for each specific size class.

In further embodiments of the invention, the FPRs associated with each FPR bin are defined for the student with highest CS in each group and the second, third and fourth CS thresholds. In several embodiments of the invention, empirical data on the number of students placed in Collusion Groups from a set of 31 proctored examinations taken by 9,366 students estimate the FPRs of groups defined by the second, third and fourth CS thresholds as the following table.

TABLE 2

| FPR | Collusion Group FPR bin defined by CS |
|---|---|
| 0.5% | second threshold < CS ≤ third threshold |
| 0.2% | third threshold < CS ≤ fourth threshold |
| 0.05% | fourth threshold < CS |

FPRs for Collusion Groups in all other examinations can be inferring using the highest CS from each group and the above ranges.

Figure 9:
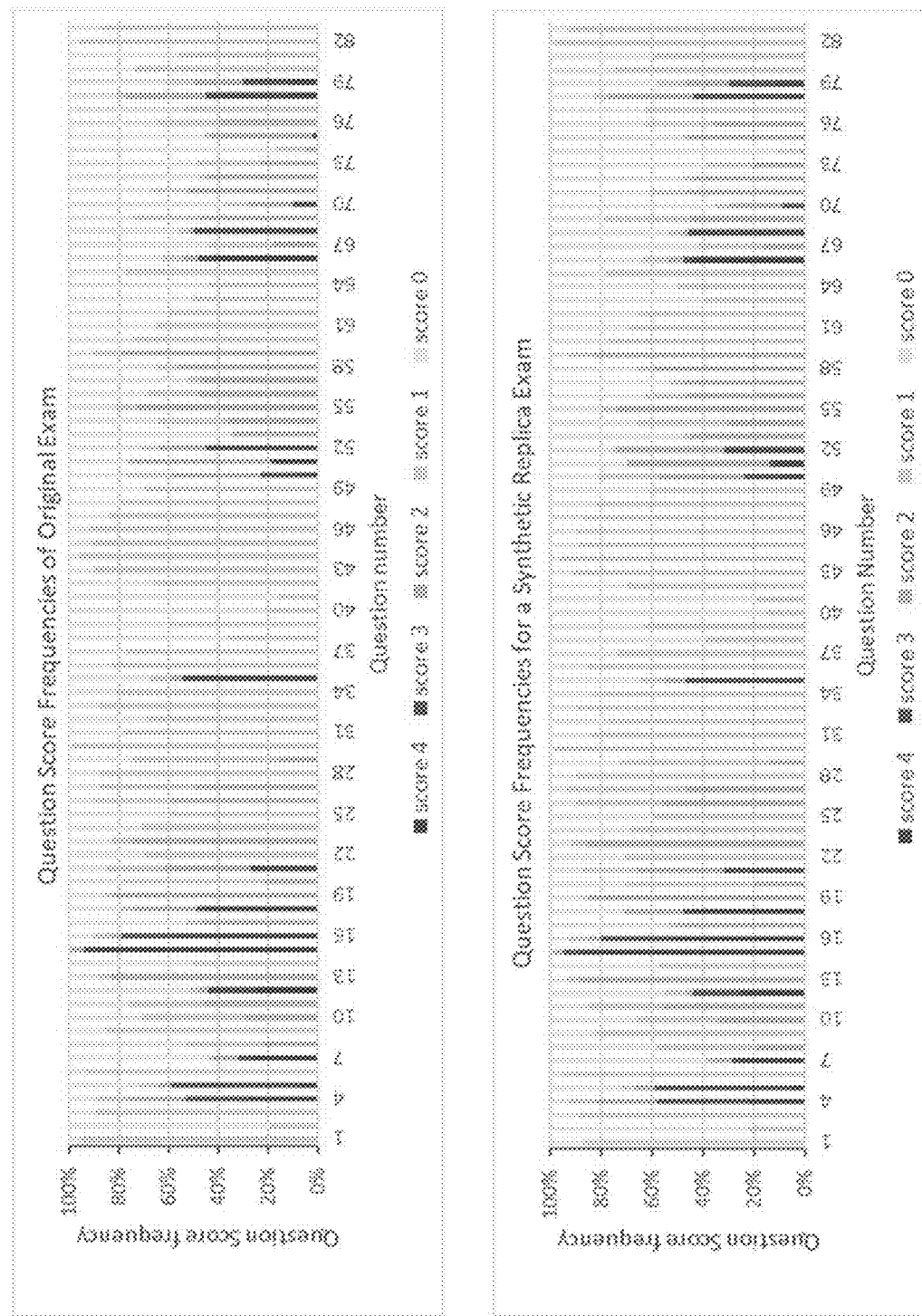
FIG. 9 illustrates frequency of scores for an example group of students in accordance with embodiments of the invention.

As an independent estimate for the FPRs determined by student collusion detection, the inventors have generated synthetic exam results that have typical distributions of Question and Test Scores, but in which the scores for each student are otherwise independent of those of the other students. The bar graphs in FIG. 9 illustrate the challenge in generating such synthetic exam data. The top graph shows the frequency of scores for each of 83 questions for 100 students who have been randomly sampled from a real exam. The questions in this particular exam have different maximum scores of between 1 to 4 (FIG. 9, light blue to black). Some questions are relatively straightforward and most students obtain the maximum score, for example question 1. Other questions are more challenging and only a minority of students obtain the maximum score, for example questions 78 and 79. Additional analysis shows that students who perform well on one challenging question tend to perform well on the other challenging questions and vice versa for those students who perform poorly. Thus, there are complex relationships between student's question score frequencies that are not due to collusion but reflect students' overall abilities and question difficulty. Any valid synthetic approach must capture these complexities.

In these such analyses, it was found that data generated randomly to match multinomial distributions of scores for each question capture the overall frequencies of both question and test scores. This can be seen by comparing the synthetic data in the lower bar graph to that of the students original scores in the upper bar graph in FIG. 9. The two bar graphs are similar and the Pearson correlation between the data in the two plots is r=0.99, showing that a multinomial distribution strategy is reasonable. Crucially, it was found that to derive a distribution of test scores that match those of real exams, it is necessary to synthetically derive data for quantiles of students ranked by test score. In certain embodiments of the invention, the class is divided into five quantiles, each of which is treated separately. If instead synthetic data is generated to match multinomial distributions of question scores for the whole class at once, the distribution of tests scores that results is much narrower than in real exams and thus are not useful. For the examples shown in FIG. 9, the median test score is 93.8 for the original test scores and 93.5 for synthetic data using five quantiles, with standard deviations of 25.9 and 26.6 respectively. More generally, the medians and standard deviations for 1,000 synthetic exams each for class sizes 200, 150, 100, 50 and 25 are within 1% of those of the real exams scores they replicate, except that the standard deviations for class sizes 50 and 25 are within 2%. Thus by dividing the class into five quantiles, a fair approximation of test scores found in real exams can be obtained.

Analysis of thousands of these synthetic exams for the above five class sizes using collusion detection techniques described here yield similar FPRs to those determined from strictly proctored in-person examinations.

Subsampling of the proctored control datasets to create virtual exams of differing class sizes shows that the CSs corresponding to percentiles for the four CS thresholds can differ depending on the number of students in a class, as shown in the table in FIG. 10. To calculate these corresponding CS thresholds, each of 19 proctored exams was subsampled 100 times to produce 19×100=1,900 exams for each of 27 class sizes. From the pooled CSs for each class size <250, the CS corresponding to the percentiles of the four CS thresholds for classes >250 was determined. These CSs were smoothed by local averaging and the resulting values are shown in the table in FIG. 10. Two independent checks support the accuracy of this strategy. In one, the percent of students assigned to each of the three Collusion Group FPR bins in the subsampled virtual exams for a class size of 50 were determined. These percentages were found to be lower than the FPR inferred from the 31 proctored exams, suggesting that the inferred FPRs used are reasonable. In the second, synthetic Question Scores arrays were generated that reflect the frequencies of Question and Test Scores in subsampled virtual exams, but in which each student's Question Scores are otherwise independent of all other students'. Each array was generated from multinomial distributions for each of five quantiles of students ranked by Test Score. From data from a single unproctored exam in which 14% of students known to have cheated were placed into Collusion Groups, 10 synthetic exams were generated for each of 100 subsamples of this original exam data for class sizes 25, 50, 100, 150, and 200, i.e. 1,000 synthetic exams per class size. The percent of students assigned to Collusion Groups in the synthetic exams was similar to or lower than for the 31 proctored exams, with only modest variations in the percentages assigned to the three FPR bins. This is particularly striking as the original exam data identified 15 Collusion Groups of between 2 to 5 students, whereas most of the synthetic exams identified none.

Figure 11:
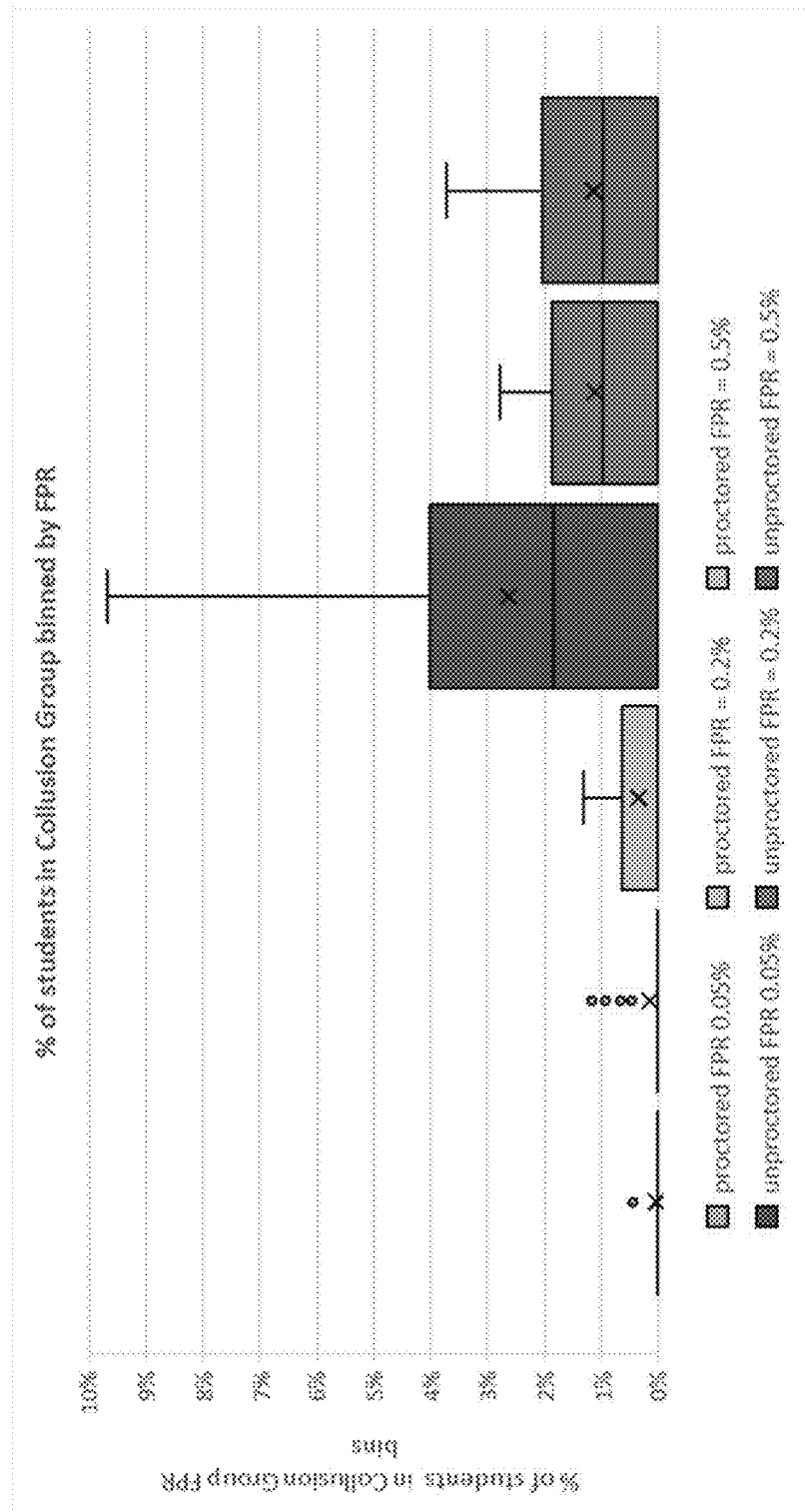
FIG. 11 illustrates collusion group bins for students in different example exams in accordance with embodiments of the invention.

Evidence that the student collusion detection methods are effective is shown in FIG. 11. The box and whisker plots in the figure show the percent of students placed into each Collusion Group FPR bin for twenty eight prepandemic, in-person proctored exams (light colors, left, 9,203 individual tests) and twenty five pandemic era, unproctored exams (dark colors, right, 7,458 individual tests). The median and interquartile range are shown by the boxes; the maxima by the larger of the whisker or outlier dot; and the means by the "x". Approximately half of all students placed into Collusion Groups in unproctored exams are found in the 0.05% FPR bin, whereas very few students in the proctored exams are placed in this FPR bin. For the 0.2% and 0.5% FPR bins more students are found in unproctored exams than proctored exams, but the discrimination is less clear cut than at 0.05% FPR. In those unproctored exams in FIG. 11 in which the percentages of students placed into Collusion Group bins is significantly higher than the FPR(s) estimated for these bins, it is likely that students colluded in these classes. That being said, the results may not be sufficient to accuse specific students of collusion. Confirmation can be performed by obtaining independent additional evidence from careful forensic analysis of written answers.

The student collusion detection techniques presented here are unique in being informed by a large dataset of students known to have colluded based on such independent validation using forensic analysis of the written answers of students (i.e. a list of true positives) and by a similar list of students known not to have colluded based on the same forensic approach (i.e. a list of true negatives). Because earlier methods were limited to multiple choice tests, no additional information was available in these exam data to determine which students had or had not in fact colluded.

It has been observed that, while one member of a pair of students who did not collude (i.e. a true negative) may have an unusually high CS, the other member of the pair often will not. Thus, requiring both members of a pair to have high CSs reduces false positives. On-the-other-hand, many pairs of students who have colluded do not both have equivalently high CS. To identify a high percent of true positives while controlling the FPR, the techniques described here balance these trends by using two high but different thresholds on CSs. Many embodiments of the invention require the CS of at least one student in every Collusion Group to be above the second CS threshold (currently CS the 99.71 percentile) while the CS of all other members of the group must be above a slightly less stringent first CS threshold (currently CS≥94.55). A single threshold using the second CS threshold for both members of a pair would dramatically lower the percent of true positives identified. A single threshold for both members of a pair at the first CS threshold would greatly increase the FPR.

Complexity

Student collusion detection in accordance with embodiments of the invention can be applicable to a wide array of exams types. However, any such method is more useful when it can provide instructors with an estimate of how effectively it can detect collusion based on the extent of data the instructor has provided. It can also be important that the method not provide results when insufficient data has been provided to produce usable results. Finally, if insufficient data is available, it is extremely helpful if the method provides advice and mechanisms to increase the amount of useful data and thus when rerun using this increased data provide meaningful results.

Instructors differ in the style and difficulty of exams that they set. For example, at one extreme a confirmatory exam may be set in which most questions are answered correctly by almost all members of the class. As a result, most students will have similar scores for each question. Alternatively, in a more rigorous test students may obtain a wide distribution of scores for each question. In investigation by the inventors, for the 30 questions in a set of benchmarking exams that have the smallest variation in scores among students, the percent of true positives obtained at 5% false positive rate was 13%. By contrast, for the 30 questions for which the class had the largest variation in scores, the true positive rate is 48%. This shows that questions that give the greatest discrimination between students are more powerful for detecting collusion.

To account for both the number of questions and the discriminatory power of each question, student collusion detection in accordance with certain embodiments of the invention can calculate a Complexity value for each exam based on the Question Score data provided. The Complexity defines the percent of true positives that student collusion detection may identify given the Question Score data. Student collusion detection in accordance with some embodiments can also apply minimum threshold requirements on both the number of Question Scores and the Complexity. Exam data that fall below these minimum thresholds would not be processed. Instead, student collusion detection can provide recommendations on how to increase the data to the level required for successful analysis. Processes for calculating Complexity will be discussed further below.

The student collusion detection techniques discussed here are unique in using the measured Complexity and the number of question scores to determine and report if the exam data that instructors have provided are sufficient to allow a credible analysis. If the information content of exams is too low, the percent of true positives identified will be poor and the FPR could be unacceptably high. It therefore is important to prevent low information content exam data from being used. By contrast, other prior collusion detection methods do not calculate Complexity and will either produce predictions on any input data, however, inadequate, or are only tuned to work on a highly specific form of exam, such as the SAT exam. The collusion detection techniques discussed here are designed to be general to all exams, providing they contain sufficient information.

When the Complexity or number of questions for an exam are too low to allow useful results, student collusion detection allows data from two or more exams from the same class to be combined. In several embodiments of the method, data from the exams is simply combined by the method when the data is provided by the instructor.

The student collusion detection techniques discussed here are unique in combining data from multiple exams to overcome a threshold on Complexity to increase the range of exams that can be meaningfully analyzed.

Processes for Producing Collusion Scores

Figure 12:
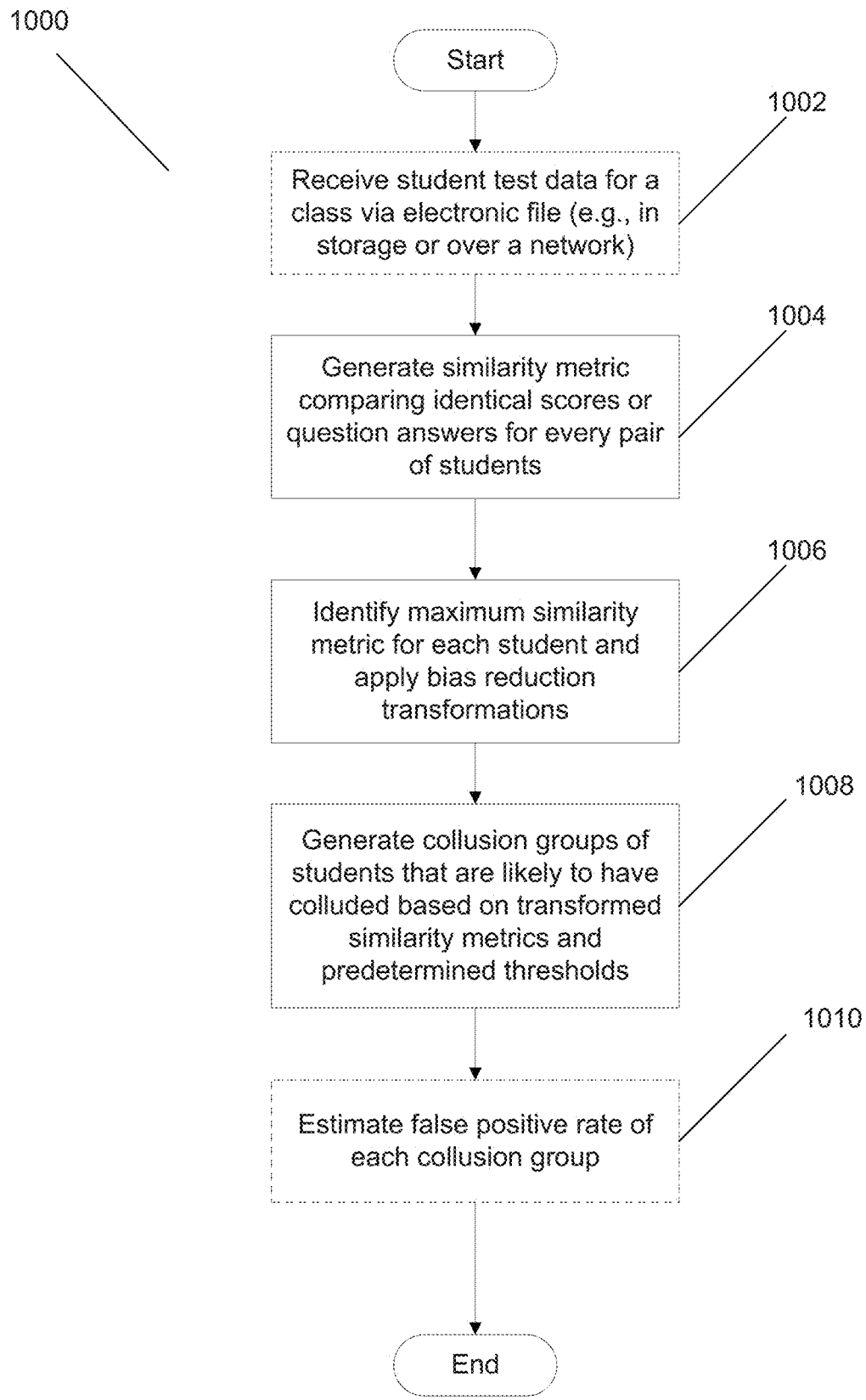
FIG. 12 illustrates a process for generating collusion scores in accordance with embodiments of the invention.

A normalized metric referred to here as a Collusion Score (CS) can be computed for each student, and is indicative of the similarity of their Question Scores to those of another member of the class, referred to as the First Partner. Here a "class" can refer to the group of students to be compared who have taken one or more of the same tests. A process for generating Collusion Scores in accordance with embodiments of the invention is illustrated in FIG. 12. The process 1000 can include receiving (1002) an input student data file. This can be entered on the same computing device that will perform the processing, or sent from a client device to a server as discussed further above.

The process includes generating (1004) a similarity metric comparing identical Question Scores for every pair of students. In several embodiments, the metric can be an identity score $IS_{ij}$ for every pair of students within the class, where i is the first student of the pair and j is the second student in the pair within the class. For a class of size N, there would be $(N^2/2)-N$ non-redundant ISs.

The "Max IS" can be determined (1006) for each student as the highest IS of all pairs including that student. That is, for student i, the maximum IS is the highest $IS_{ij}$ where i is in the pair. For a class of size N, there are thus N Max ISs, one per student.

The Max IS can then be normalized to mitigate systemic bias to yield a single Collusion Score (CS) per student. First, a student specific bias can be mitigated by subtraction the median IS of the distribution of ISs for each student from the Max IS, resulting in an Identity Metric (IM) for each student. This can be expressed for each student i as:

$$IM_i = (\text{Max } IS_i) - (\text{median } IS_i)$$

Second, the tendency of students with similar Test Scores to have more similar IMs than students with quite different Test Scores can be mitigated as follows. Students are first ranked by total Test Score bringing students of similar ability into proximity. A sliding window that spans a subset of students can be used to produce local median values for IMs at every position in the Test Score rank list. For most students, the windows are centered on that student and extend an equal number of students above and below the student on the rank list. However, for the three students at each end of the rank list, the windows cannot be centered and instead the three students all share the same window. In many embodiments of the invention, for classes of 31 or more students, the windows cover 31 students, except at the ends of the rank list, where they progressively shorten to 7 students. For classes of 25 to 30 students, the windows are the maximum length possible in the center but shorten to 7 at the ends. As an example, for a student Test Score rank 50 in a class of 100, the median of the IMs for students ranks 35 to 65 is calculated. The CS for each student i is the ratio of IM divided by the local median IM:

$$CS_i = IM_i / (\text{local median } IM_i)$$

Two additional sources of bias may affect a small number of students in a minority of exams and can be addressed in further embodiments of the invention. The first of these occasional biases can result from students who score zero on most questions and is removed by the simple expedient of excluding students whose Test Scores are ≤5% of the highest Test Score obtained in the exam. The second occasional bias can result from clerical errors that lead to data for one or more students being present more than once, often with similar but not identical Question Scores. To eliminate this bias, student collusion detection can ignore data from any rows that share the same Student ID as well as data in any row lacking an ID. It can then list the IDs of any data it ignores.

With the biases removed, the CSs provide a simple ranking of Student-First Partner pairs, one CS for each student with useful data. The Student-First Partner pair with the highest CS are the most likely have to colluded. This ranking permits instructors to focus their forensic comparison of exam answers on those student pairs most likely to have colluded.

The process includes generating (1008) Collusion Groups. Several embodiments also include providing (1010) an estimate of FPR for each Collusion Group. Although a specific process is discussed above with respect to FIG. 12, one skilled in the art will recognize that any of a variety of processes may be utilized for generating Collusion Scores in accordance with embodiments of the invention. Next will be discussed forming Collusion Groups—that is determining the likelihood of groups of three or more students colluding.

Processes for Forming Collusion Groups

Those students that are likely to have colluded can be placed into Collusion Groups and the false positive rate (FPR) for each group can be estimated. In many embodiments of the invention, student collusion detection uses two CS thresholds to define which students are in Collusion Groups and two additional CS thresholds to assign the groups one of three FPRs. By empirical evidence and experimentation, the CS thresholds have been set using the distribution of CSs from 19 proctored exams taken by a total 6,847 students. Students are presumed not to have colluded in these exams and thus these data can be used to estimate the FPR. The thresholds on the distribution of CSs are shown below in Table 3:

TABLE 3

| Threshold | CS percentile | Role |
|---|---|---|
| First | 94.55 | all Collusion Group members must have CS ≥ than |

TABLE 3-continued

| Threshold | CS percentile | Role |
|---|---|---|
| Second | 99.71 | CS of one or more members of each group must be ≥ than |
| Third | 99.88 | separates groups of 0.5% FPR from those of 0.2% FPR |
| Fourth | 99.99 | the lower bound for groups with FPR 0.05% |

Figure 13:
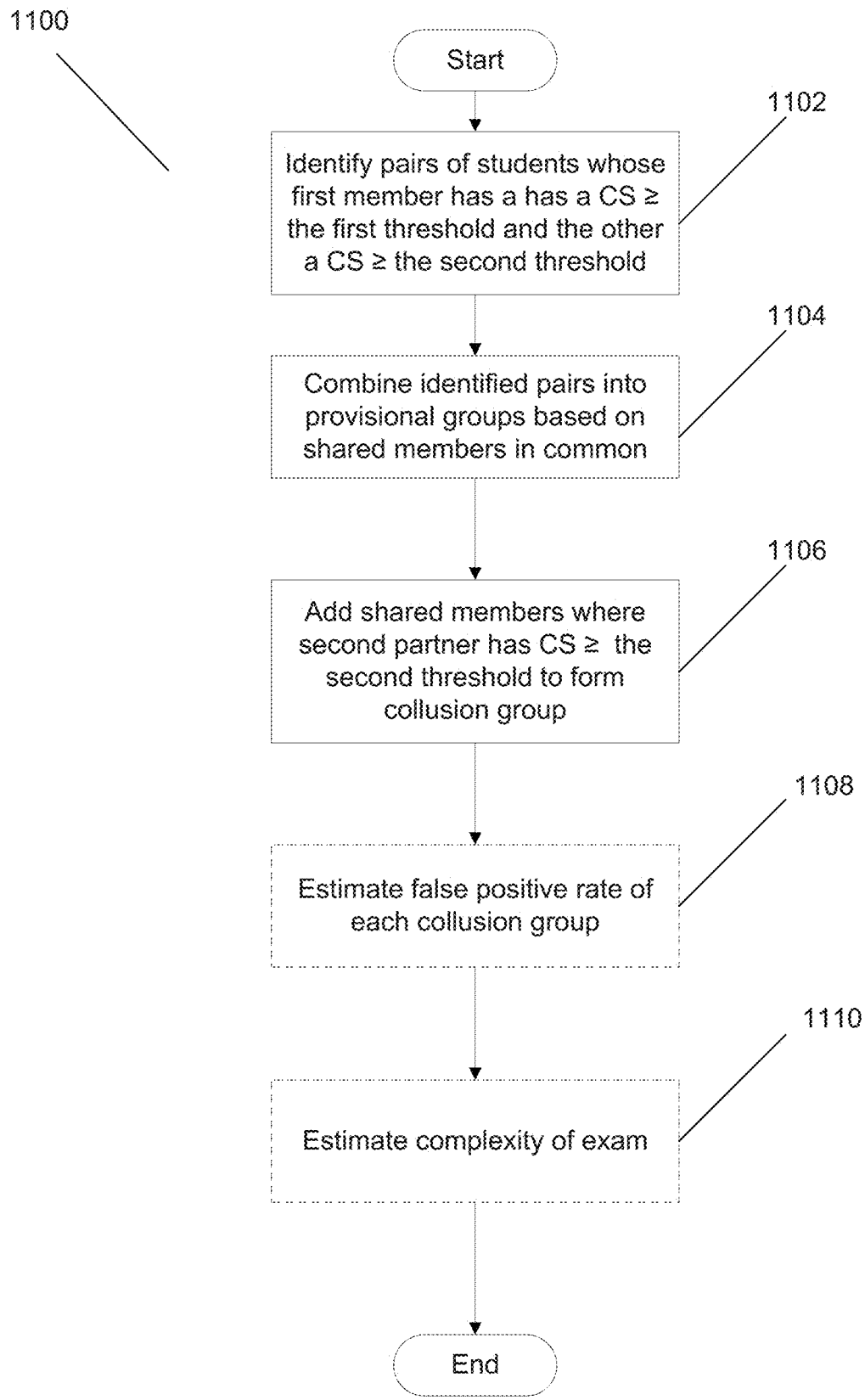
FIG. 13 illustrates a process for assigning students to collusion groups in accordance with embodiments of the invention.

A process for assigning students into Collusion Groups is illustrated in FIG. 13. The process 1100 includes identifying (1102) all pairs of Students with a First Partner for which one member has a CS≥the first threshold and the other a CS≥the second threshold.

Next, from this set of identified pairs, pairs that share one or more members are combined (1104) to form Provisional Groups. For example, if student A is found in two identified pairs, one pair including student B and another pair including student C, a Provisional Group containing students A, B, and C is formed.

Then, if two members of a Provisional Group share a member of another Provisional Group as a Second Partner with CS≥the second threshold, this member and their partner(s) are added (1106) to the Provisional Group. For example, if the pairs A-B and A-C both have student X as a Second Partner and Student X has CS≥second threshold, student X and its partner(s) are grouped with students A, B and C. The groups resulting from these combinations can be referred to as Collusion Groups.

In further embodiments of the invention, a false positive rate (FPR) can be assigned (1108) to each Collusion Group. In some additional embodiments, a Complexity of questions on the exam can be estimated (1110). Although a specific process is discussed above with respect to FIG. 13, one skilled in the art will recognize that any of a variety of processes may be utilized for creating Collusion Groups in accordance with embodiments of the invention. Processes for calculating FPRs in accordance with embodiments of the invention will be discussed below.

Processes for Estimating False Positive Rates

FPRs can represent an expected proportion of students that have been placed into Collusion Groups by processes discussed above, but who did not actually collude. At least two methods can used to determine FPRs. In one, a so-called empirical FPR can be estimated as the proportion of students assigned to Collusion Groups in strictly proctored exams because it is assumed that cheating in such exams is either not possible or is exceptionally rare. In the second, a so-called synthetic FPR can be derived from the proportion of students assigned to Collusion Groups for synthetic exam results that have typical distributions of an exam's Question and Test Scores but in which the scores for each student are otherwise independent of those of the other students.

Collusion Groups can first be assigned to one of three FPR bins using the highest CS in each group and the second, third and fourth thresholds in Table 2 and FIG. 10.

The empirical FPRs for each of the three bins can be determined as the percent of students assigned to Collusion Groups in a large set of strictly proctored exams. In many embodiments of the invention, these FPRs are based on a set of 31 proctored examinations taken by 9,366 students and the FPRs are shown in Table 2 further above. The empirical FPRs of all other exams can be taken to be those from this set of 31 proctored exams since the CS thresholds are dynamically altered to account for differences due to class size.

Synthetic FPRs can be determined for the same three bins based on identical CS thresholds. For a specific query exam, synthetic data can be generated randomly to match multinomial distributions of scores for each question to capture the overall frequencies of both Question and Test Scores, as shown earlier for the example in FIG. 9. To ensure that the distribution of Test Scores approximates those of the query exam, the data is divided into for quantiles of students ranked by Test Score. In several embodiments of the invention, the class is divided into five quantiles, each of which is treated separately. It is useful to generate multiple replica synthetic exams and determine the percent of students assigned to each Collusion Group bin to derive the FPR estimate. In several embodiments of the invention, of the order of 50,000 students worth of synthetic Question Score data is produced.

The percent of students assigned to Collusion Groups in thousands of synthetic exams for a variety of class sizes have been found to yield similar FPRs to the empirical FPRs determined from strictly proctored in-person examinations. The fact that two independent FPR estimates agree implies that both are reasonable. The synthetic FPR for a specific query exam provided by an instructor can be calculated and included in the output file, yielding an estimate that closely reflects the particular details of that exam and thus giving additional assurance of accuracy.

In some additional embodiments, a Complexity of questions on the exam can be estimated (1110). Processes for calculating Complexity will be discussed below.

Processes for Providing Exam Feedback on Complexity

As discussed further above, a measure referred to as "Complexity" can be calculated to quantify the statistical power on a given exam. The CSs of students who colluded are separated more cleanly from those of students who have not cheated as the number of Question Scores increase and when the variation in scores achieved by students in the class for each question is higher. A Complexity measure in accordance with embodiments of the invention can capture these two variables as follows.

Complexity for a single question can be calculated as $\log_{10}$ (1/probability that two students obtain the same score), where the probability is the sum of the squares of the observed frequencies for each score. The Complexity for an exam can be calculated as the sum of the Complexities for each question.

Two unproctored benchmarking exams were used to determine the relationship between Complexity and the percent of students known to have colluded. Detailed forensic analysis of written answers identified tens of undergraduates who colluded on these two benchmarking exams. The table in FIG. 14 shows the average percent of colluding students identified (i.e. the recall) at a 5% false positive rate (FPR) in exams subsampled to have different numbers of Question Scores, with the corresponding recall given for each Complexity value. As expected, the recall of colluding students identified increases with Complexity. Subsequent analysis of additional unproctored exams are consistent with these results.

Collusion detection methods such as those described further above may not be completely reliable for exams of Complexity <10 or number of questions <20 because there are insufficient CS values, making their distributions unpredictable. Some cases with Complexity <10 may also result in aberrantly high FPRs. Therefore, it may not be productive to calculate CSs for exams or combination of exams Complexity <10 (FIG. 14, red) or number Question Scores <20. While exams with 10≤Complexity <15 (FIG. 14, light green) provide useful information, ideally exams should have a Complexity ≥15 (FIG. 14, dark green). To estimate the Complexity of exams prior to giving the exam to the class, student collusion detection may be performed on the results of similar exams from prior years. As a guide, the mean Complexity per question that was observed in exams is 0.33 with a minimum of 0.16 and a maximum of 0.65. Achieving a Complexity of 15 will usually require at least 40 Question Scores.

Exam Complexity can be increased by any of a variety of ways in accordance with embodiments of the invention. First, for questions that carry many points, scores for parts of the question can be broken down and recorded separately to generate more independent scores. Second, if a subset of questions on the test are multiple choice, the students' choice of answer can be recorded as a Question Score. As a result, for questions that a student gives the wrong answer, there is additional information compared to only knowing that the answer was incorrect and thus multiple-choice answers provide higher Complexity than graded scores. Third, Complexity can also be increased by combining data from two or more exams from the same class. For example when the data is in a one or more data files, the rows of data associated with different exams can be appended together. This can be highly effective when multiple short exams are given in a class.

Processes such as those in accordance with embodiments of the invention can provide suggestions with a report of collusion scores and/or collusion groups (or the inability to generate these) to how to increase the Complexity of the associated exam. Suggestions can include one or more of the ways of increasing Complexity listed above.

CONCLUSION

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for identifying specific groups of colluding students in academic exams and level of confidence by a false positive rate from an input electronic file of test data, the method comprising:

receiving, by a collusion detection system from a client device, an input electronic file comprising a set of academic test data representing results of at least one student exam, where the academic test data includes student identifiers associated with students taking the at least one student exam, question scores associated with each student identifier, and the total score for each student on the test;

calculating an identity score for each pair of students, the identity score representing a quantified similarity of question scores of the students within each pair;

determining a maximum identity score for each student, which is the highest identity score of all pairs of students including that student;

generating a collusion score for each student from the maximum identity score of that student by:

subtracting from the maximum identity score an average identity score to generate an identity metric for that student, where the average identity score is an estimated average of identity scores associated with pairs of students including that student;

constructing a ranked list of students where the students are ranked by total test score; and dividing the identity metric of that student by a local average identity metric to generate a collusion score for that student, where the local average identity metric is an estimated average of a set of identity metrics for a subset of students who lie adjacent to one another on the total test score ranked list;

determining one or more collusion groups of students from the collusion scores by identifying students whose collusion scores are above at least one collusion score threshold;

generating synthetic exam results for a plurality of synthetic exams by generating random question scores for synthetic students that follow the frequencies of questions scores in the at least one student exam using the collusion detection system;

determining one or more synthetic collusion groups from the synthetic exam results using the at least one collusion score threshold;

estimating a synthetic false positive rate for one or more collusion groups in the at least one student exam based on the number of synthetic students identified as being members of one or more collusion groups in the synthetic exam results; and sending the determined one or more collusion groups and the student identifiers of their members, and the estimated synthetic false positive rates associated with the collusion groups, to the client device by the collusion detection system.

2. The method of claim 1:
where receiving, by the collusion detection system, an input electronic file comprising the set of academic test data representing results of at least one student exam further comprises:
receiving, by the collusion detection system, the input electronic file from a client device over a network; and the method further comprises:
sending the output electronic file to the client device over the network.

3. The method of claim 1, further comprising
displaying student identifiers and associated collusion scores in a visual format on a display screen.

4. The method of claim 1, further comprising
determining collusion groups from the collusion scores by:
identifying pairs of students with a first member of the pair having a collusion score above a first predetermined threshold and the second member of the pair having a collusion score above a second predetermined threshold, where the second predetermined threshold is greater than the first predetermined threshold;
combining identified pairs of students into provisional groups when pairs share one or more members;
creating collusion groups from provisional groups by, for each provisional group, combining an additional provisional group into the provisional group if two members of the provisional group have a third member of the additional provisional group as a second partner and the collusion score of the third member is greater than the second predetermined threshold, where the third member is a second partner to each of the two members when they have the second highest identity score in pairs with each of the two members, where the collusion groups are referenced by student identifiers for the students in each group; and writing collusion groups including student identifiers of students associated with each collusion group to the output electronic file.

5. The method of claim 1, wherein calculating an identity score for each pair of students further comprises:
for each pair of students:
counting each question on the at least one student exam where the students provided the same answer and counting each question on the at least one student exam where the students received the same score;
adding the counted questions to generate an identity score as a sum.

6. The method of claim 1, wherein calculating an identity score for each pair of students further comprises:
for each pair of students, calculating a Pearson correlation between question scores between the students of the pair as the identity score.

7. The method of claim 1, further comprising
administering control exams to groups of students;
calculating the plurality of thresholds based on results of the control exams and knowledge of the prevalence of cheating on the control exams.

8. The method of claim 1, wherein the academic test data is in numerical format representing a graded number of points each student received for each answered question.

9. The method of claim 1, wherein the academic test data is in multiple choice format representing an answer each student provided for each answered question.

10. The method of claim 1, further comprising manually comparing written answers of students within each collusion group when the at least one student exam includes non-multiple-choice questions; and
writing a recommendation to the output electronic file that collusion by specific students only be assumed when manual comparison of written answers confirms that collusion has occurred.

11. The method of claim 1, where there are at least 25 students.

12. The method of claim 1, further comprising removing from consideration students whose test scores are 5% or less of the highest test score.

13. The method of claim 1, where at least some rows of academic test data are associated with a student identifier and the method further comprises removing from consideration rows of academic test data that have no associated student identifier and rows of academic test data that have the same duplicated student identifiers; and
writing a warning to the output electronic file that student rows have been removed and recommending that the exam data be correct and submitted for reanalysis.

14. The method of claim 1,
wherein estimating a synthetic false positive rate for one or more collusion groups in the at least one student exam further comprises:
estimating a synthetic false positive rate for each collusion group based on the highest collusion score among students in the collusion group and the relation of whether the highest collusion score is greater than any of a second predetermined threshold, a third predetermined threshold, and a fourth predetermined threshold, where the fourth predetermined threshold is greater than the third predetermined threshold and the third predetermined threshold is greater than the second predetermined threshold.

15. The method of claim 1, further comprising estimating an empirical false positive rate for each collusion group utilizing a large dataset of empirical data including past exams to determine at least one collusion score threshold for a class size of the total number of students.

16. The method of claim 15, further comprising: wherein estimating an empirical false positive rate for each collusion group further comprises:
    estimating a empirical false positive rate for each collusion group based on the highest collusion score among students in the collusion group and the relation of whether the highest collusion score is greater than any of a second predetermined threshold, a third predetermined threshold, and a fourth predetermined threshold, where the fourth predetermined threshold is greater than the third predetermined threshold and the third predetermined threshold is greater than the second predetermined threshold.

17. The method of claim 1, wherein the set of academic test data represents results of at least two student exams, the student exams having associated student identifiers in common with each other.

18. The method of claim 1, further comprising
    calculating, using the collusion detection system, a combined complexity value representing a quantified amount of question score information in the academic test data and indicative of greater accuracy in placing students in collusion groups by:
        calculating complexity of each question within the academic test data sing a metric based on the probability that two students obtain the same score, where the probability that two students obtain the same score is the sum of squares of observed frequencies of each score;
        combining the complexity values of each question to generate a combined complexity value for all questions; and
    writing an indication whether the combined complexity value is high enough for useful analysis and at least one suggestion for increasing complexity to the output electronic file.

19. The method of claim 18, wherein calculating complexity of each question within the academic test data comprises:
    calculating complexity of each question as log 10 (1/probability that two students obtain the same score); and
    adding together the complexity of each question for all questions to generate the combined complexity value.

20. The method of claim 1, wherein the estimated average of identity scores is the median of identity scores and the estimated average of a set of identity metrics is the median of identity metrics.

21. The method of claim 1, further comprising
    generating, using the client device, an input electronic file comprising a set of academic test data representing results of at least one student exam, where the academic test data includes student identifiers associated with students taking the at least one student exam, question scores associated with each student identifier for each test, and a total score for each student on each test, by:
        presenting the at least one student exam to a plurality of students;
        collecting, using the client device, question scores associated with each student identifier for questions in the at least one student exam;
        collecting, using the client device, a total score associated with each student identifier for each student exam; and
        writing, using the client device, the collected question scores and total scores associated with each student identifier into an input electronic file.

22. The method of claim 1, further comprising
    displaying on the client device: the collusion groups, the estimated false positive rates, and a visual indication of the student identifiers associated with each collusion group.

23. The method of claim 22, further comprising
    displaying on the client device a graphical representation of a relationship between student identifiers and a calculated variable taken from the group consisting of: identity score, maximum identity score, and collusion score.

24. The method of claim 1, further comprising sending the student identifiers and the collusion scores associated with each student identifier to the client device.

25. A collusion detection system comprising:
    a processor;
    a non-volatile memory including a collusion detection application;
    wherein the processor is configured by the collusion detection application when executed to:
    receive, from a client device, an input electronic file comprising a set of academic test data representing results of at least one student exam, where the academic test data includes student identifiers associated with students taking the at least one student exam, question scores associated with each student identifier, and the total score for each student on the test;
    calculate an identity score for each pair of students, the identity score representing a quantified similarity of question scores of the students within each pair;
    determine a maximum identity score for each student, which is the highest identity score of all pairs of students including that student;
    generate a collusion score for each student from the maximum identity score of that student by:
        subtracting from the maximum identity score an average identity score to generate an identity metric for that student, where the average identity score is an estimated average of identity scores associated with pairs of students including that student;
        constructing a ranked list of students where the students are ranked by total test score; and
        dividing the identity metric of that student by a local average identity metric to generate a collusion score for that student, where the local average identity metric is an estimated average of a set of identity metrics for a subset of students who lie adjacent to one another on the total test score ranked list;
    determine one or more collusion groups of students from the collusion scores by identifying students whose collusion scores are above at least one collusion score threshold;
    generate synthetic exam results for a plurality of synthetic exams by generating random question scores for synthetic students that follow the frequencies of questions scores in the at least one student exam using the collusion detection system;

determine one or more synthetic collusion groups from the synthetic exam results using the at least one collusion score threshold;

estimate a synthetic false positive rate for one or more collusion group in the at least one student exam based on the number of synthetic students identified as being members of one or more collusion groups in the synthetic exam results; and send the determined one or more collusion groups and the student identifiers of their members, and the estimated false positive rates associated with the collusion groups to the client device.

26. The collusion detection system of claim 25:

where receive an input electronic file comprising the set of academic test data representing results of at least one student exam further comprises:

receive, by the collusion detection system, the input electronic file from a client device over a network; and the method further comprises:

sending the output electronic file to the client device over the network.

27. The collusion detection system of claim 25, wherein the client device is configured to:

display student identifiers and associated collusion scores in a visual format on a display screen.

28. The collusion detection system of claim 25, wherein the processor is further configured by the collusion detection application when executed to:

determine collusion groups from the collusion scores by:

identifying pairs of students with a first member of the pair having a collusion score above a first predetermined threshold and the second member of the pair having a collusion score above a second predetermined threshold, where the second predetermined threshold is greater than the first predetermined threshold;

combining identified pairs of students into provisional groups when pairs share one or more members;

creating collusion groups from provisional groups by, for each provisional group, combining an additional provisional group into the provisional group if two members of the provisional group have a third member of the additional provisional group as a second partner and the collusion score of the third member is greater than the second predetermined threshold, where the third member is a second partner to each of the two members when they have the second highest identity score in pairs with each of the two members, where the collusion groups are referenced by student identifiers for the students in each group; and write collusion groups including student identifiers of students associated with each collusion group to the output electronic file.

29. The collusion detection system of claim 25, wherein calculating an identity score for each pair of students further comprises:

for each pair of students:

counting each question on the at least one student exam where the students provided the same answer and counting each question on the at least one student exam where the students received the same score;

adding the counted questions to generate an identity score as a sum.

30. The collusion detection system of claim 25, wherein calculating an identity score for each pair of students further comprises:

for each pair of students, calculating a Pearson correlation between question scores between the students of the pair as the identity score.

31. The collusion detection system of claim 25, wherein the processor is further configured by the collusion detection application when executed to:

administer control exams to groups of students;

calculate the plurality of thresholds based on results of the control exams and knowledge of the prevalence of cheating on the control exams.

32. The collusion detection system of claim 25, wherein the academic test data is in numerical format representing a graded number of points each student received for each answered question.

33. The collusion detection system of claim 25, wherein the academic test data is in multiple choice format representing an answer each student provided for each answered question.

34. The collusion detection system of claim 25, wherein the processor is further configured by the collusion detection application when executed to manually compare written answers of students within each collusion group when the at least one student exam includes non-multiple-choice questions; and write a recommendation to the output electronic file that collusion by specific students only be assumed when manual comparison of written answers confirms that collusion has occurred.

35. The collusion detection system of claim 25, where there are at least 25 students.

36. The collusion detection system of claim 25, wherein the processor is further configured by the collusion detection application when executed to remove from consideration students whose test scores are 5% or less of the highest test score.

37. The collusion detection system of claim 25, where at least some rows of academic test data are associated with a student identifier and the processor is further configured by the collusion detection application when executed to remove from consideration rows of academic test data that have no associated student identifier and rows of academic test data that have the same duplicated student identifiers; and write a warning to the output electronic file that student rows have been removed and recommending that the exam data be correct and submitted for reanalysis.

38. The collusion detection system of claim 25, wherein estimating a synthetic false positive rate for one or more collusion groups in the at least one student exam further comprises:

estimating a synthetic false positive rate for each collusion group based on the highest collusion score among students in the collusion group and the relation of whether the highest collusion score is greater than any of a second predetermined threshold, a third predetermined threshold, and a fourth predetermined threshold, where the fourth predetermined threshold is greater than the third predetermined threshold and the third predetermined threshold is greater than the second predetermined threshold.

39. The collusion detection system of claim 25, wherein the processor is further configured by the collusion detection application when executed to estimate an empirical false positive rate for each collusion group utilizing a large dataset of empirical data including past exams to determine at least one collusion score threshold for a class size of the total number of students.

40. The collusion detection system of claim 25, wherein the set of academic test data represents results of at least two student exams, the student exams having associated student identifiers in common with each other.

41. The collusion detection system of claim 25, wherein the processor is configured by the collusion detection application when executed to:
  calculate a combined complexity value representing a quantified amount of question score information in the academic test data and indicative of greater accuracy in placing students in collusion groups by:
    calculating complexity of each question within the academic test data sing a metric based on the probability that two students obtain the same score, where the probability that two students obtain the same score is the sum of squares of observed frequencies of each score;
    combining the complexity values of each question to generate a combined complexity value for all questions; and
  write an indication whether the combined complexity value is high enough for useful analysis and at least one suggestion for increasing complexity to the output electronic file.

42. The collusion detection system of claim 41, wherein calculating complexity of each question within the academic test data comprises:
  calculating complexity of each question as log 10 (1/probability that two students obtain the same score); and
  adding together the complexity of each question for all questions to generate the combined complexity value.

43. The collusion detection system of claim 25, wherein the estimated average of identity scores is the median of identity scores and the estimated average of a set of identity metrics is the median of identity metrics.

* * * * *